US012684582B2

(12) United States Patent
Matsumura et al.

(10) Patent No.: US 12,684,582 B2
(45) Date of Patent: Jul. 14, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 523 days.

(21) Appl. No.: 17/914,654

(22) PCT Filed: Mar. 27, 2020

(86) PCT No.: PCT/JP2020/014297
§ 371 (c)(1),
(2) Date: Sep. 26, 2022

(87) PCT Pub. No.: WO2021/192303
PCT Pub. Date: Sep. 30, 2021

(65) Prior Publication Data
US 2023/0144020 A1     May 11, 2023

(51) Int. Cl.
*H04W 72/23*          (2023.01)
*H04W 72/12*          (2023.01)

(52) U.S. Cl.
CPC ........... *H04W 72/23* (2023.01); *H04W 72/12* (2013.01)

(58) Field of Classification Search
CPC ............................... H04W 72/12; H04W 72/23
See application file for complete search history.

(56) References Cited

U.S. PATENT DOCUMENTS

| | | | |
|---|---|---|---|
| 2018/0152274 A1* | 5/2018 | Li | H04W 28/04 |
| 2019/0297637 A1 | 9/2019 | Liou et al. | |
| 2020/0389874 A1* | 12/2020 | Lin | H04L 5/0053 |
| 2021/0105808 A1* | 4/2021 | Lei | H04L 5/0051 |
| 2021/0120529 A1* | 4/2021 | Park | H04W 72/0446 |
| 2021/0136808 A1 | 5/2021 | Yang et al. | |

(Continued)

FOREIGN PATENT DOCUMENTS

| | | | |
|---|---|---|---|
| KR | 20190054978 A | 5/2019 | |
| WO | WO-2018030872 A1 * | 2/2018 | H04W 56/001 |
| WO | 2020011084 A1 | 1/2020 | |

OTHER PUBLICATIONS

International Search Report issued in PCT/JP2020/014297 on Oct. 27, 2020 (1 page).

(Continued)

*Primary Examiner* — Joseph E Avellino
*Assistant Examiner* — Maryam Emadi
(74) *Attorney, Agent, or Firm* — Osha Bergman Watanabe & Burton LLP

(57)          ABSTRACT

A terminal according to an aspect of the present disclosure includes a receiving section that receives a piece of downlink control information of a plurality of pieces of downlink control information, and a control section that uses, among a plurality of reception occasions, a reception occasion corresponding to a quasi-co-location (QCL) parameter for receiving data, in which the plurality of pieces of downlink control information schedules each of the plurality of reception occasions, and the data is transmitted in each of the plurality of the reception occasions. According to one aspect of the present disclosure, multicast downlink data can be appropriately received.

6 Claims, 20 Drawing Sheets

(56)          References Cited

U.S. PATENT DOCUMENTS

| | | | | |
|---|---|---|---|---|
| 2022/0103325 A1* | 3/2022 | Chen | .................... | H04L 5/0016 |
| 2022/0217718 A1* | 7/2022 | Hu | ........................ | H04L 1/1812 |

OTHER PUBLICATIONS

Written Opinion of the International Searching Authority issued in PCT/JP2020/014297 on Oct. 27, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in European Application No. 20927133.7, dated Oct. 18, 2023 (10 pages).

* cited by examiner

FIG. 2B

| codepoint | QCL assumption |
|-----------|----------------|
| occasion#0 | SSB#0 |

FIG. 2A

| Index | QCL assumption |
|-------|----------------|
| occasion#0 | SSB#0 |
| occasion#1 | SSB#1 |
| occasion#2 | SSB#2 |
| occasion#3 | SSB#3 |

FIG. 4B

| Index | PDSCH resource |
|---|---|
| occasion#0 | TDRA#0, FDRA#0 |

FIG. 4A

| Index | PDSCH resource |
|---|---|
| occasion#0 | TDRA#0, FDRA#0 |
| occasion#1 | TDRA#1, FDRA#1 |
| occasion#2 | TDRA#2, FDRA#2 |
| occasion#3 | TDRA#3, FDRA#3 |

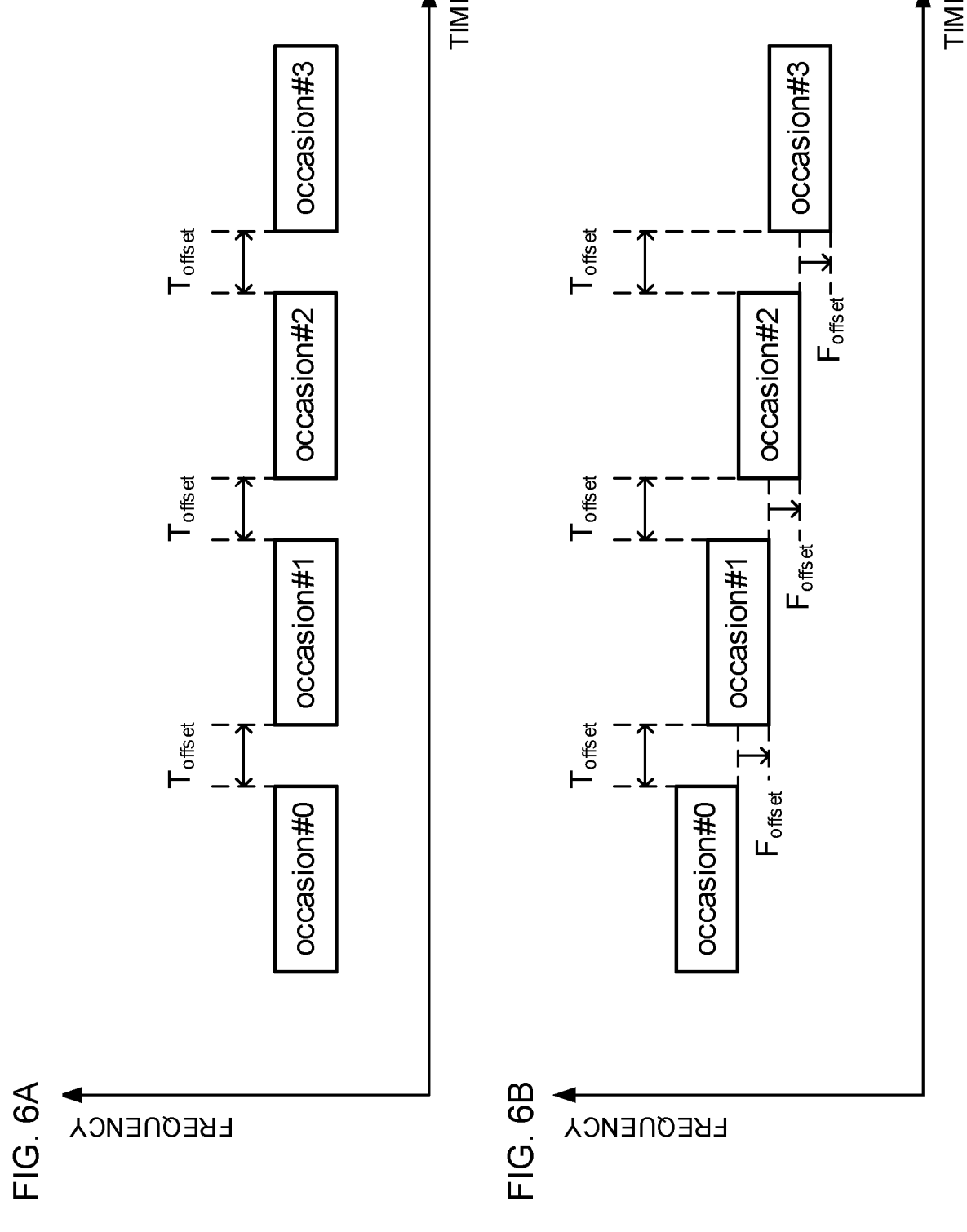

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In the universal mobile telecommunications system (UMTS) network, the specifications of long term evolution (LTE) have been drafted for the purpose of further increasing data rates, providing low delays, and so on (Non Patent Literature 1). In addition, the specifications of LTE-Advanced (third generation partnership project (3GPP) Release (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), 6th generation mobile communication system (6G), New Radio (NR), or 3GPP Rel. 15 and subsequent releases) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In a future wireless communication system (for example, NR), it is assumed that a plurality of user terminals (user terminal, User Equipment (UE)) performs communication in an ultra-dense and high-traffic environment.

In the NR, it is assumed that a plurality of UEs receives downlink data using multicast under such an environment.

However, in the conventional NR specifications, reception of multicast downlink data by the UE has not been sufficiently studied. If the downlink data is not appropriately received using the multicast, there is a possibility that the system performance deteriorates such as a decrease in throughput.

Therefore, an object of the present disclosure is to provide a terminal, a radio communication method, and a base station capable of appropriately receiving multicast downlink data.

Solution to Problem

A terminal according to an aspect of the present disclosure includes a receiving section that receives a piece of downlink control information of a plurality of pieces of downlink control information, and a control section that uses, among a plurality of reception occasions, a reception occasion corresponding to a quasi-co-location (QCL) parameter for receiving data, in which the plurality of pieces of downlink control information schedules each of the plurality of reception occasions, and the data is transmitted in each of the plurality of the reception occasions.

Advantageous Effects of Invention

According to one aspect of the present disclosure, multicast downlink data can be appropriately received.

BRIEF DESCRIPTION OF DRAWINGS

FIGS. 2A and 2B are diagrams illustrating an example of association between a reception occasion and a QCL assumption.

FIGS. 4A and 4B are diagrams illustrating an example of association between a reception occasion and a PDSCH resource.

FIGS. 6A and 6B are diagrams illustrating an example of a resource configuration/indication method 2.

Figure 1:
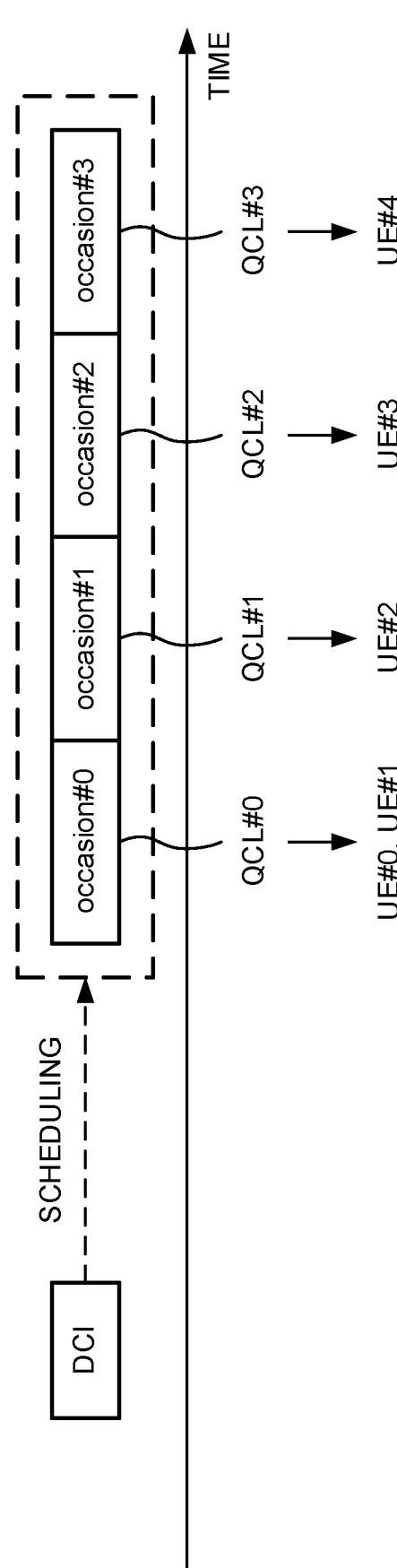
FIG. 1 is a diagram illustrating an example of group scheduling according to a first embodiment.

DESCRIPTION OF EMBODIMENTS (TCI, Spatial Relation, and QCL)

In NR, it has been studied to control reception processing (for example, at least one of reception, demapping, demodulation, and decoding) and transmission processing (for example, at least one of transmission, mapping, precoding, modulation, and coding) in UE of at least one of a signal and a channel (expressed as a signal/channel) on the basis of a transmission configuration indication state (TCI state).

The TCI state may represent what is applied to a downlink signal/channel. One corresponding to the TCI state applied to an uplink signal/channel may be expressed as a spatial relation.

The TCI state is information regarding a quasi-co-location (QCL) of the signal/channel, and may also be referred to as a spatial Rx parameter, spatial relation information, or the like. The TCI state may be configured in the UE for each channel or each signal.

In the present disclosure, the TCI state of the DL, the spatial relation of the UL, and the TCI state of the UL may be replaced with each other.

QCL is an index indicating a statistical property of a signal/channel. For example, a case where one signal/channel and another signal/channel have a QCL relation may mean that it is possible to assume that at least one of Doppler shift, Doppler spread, an average delay, a delay spread, and a spatial parameter (for example, a spatial Rx parameter) is identical (in QCL with respect to at least one of these) between the plurality of different signals/channels.

Note that the spatial Rx parameter may correspond to a reception beam of UE (e.g., reception analog beam), and the beam may be identified based on spatial QCL. QCL (or at least one element of QCL) in the present disclosure may be replaced with spatial QCL (sQCL).

A plurality of types (QCL types) of QCL may be defined. For example, four QCL types A to D with different parameters (or parameter sets) that can be assumed to be identical may be provided. These parameters (which may be referred to as QCL parameters) are as follows:

QCL type A (QCL-A): Doppler shift, Doppler spread, average delay, and delay spread;

QCL type B (QCL-B): Doppler shift and Doppler spread;

QCL type C (QCL-C): Doppler shift and average delay; and

QCL type D (QCL-D): spatial Rx parameter.

It may be referred to as a QCL assumption for the UE to assume that a certain control resource set (CORESET), channel, or reference signal has a specific QCL (for example, QCL type D) relation with another CORESET, channel, or reference signal.

The UE may determine at least one of a Tx beam (Tx beam) and a reception beam (Rx beam) of a signal/channel based on a TCI state of the signal/channel or the QCL assumption.

The TCI state may be, for example, information regarding the QCL of a target channel (In other words, a reference signal (Reference Signal (RS)) for the channel) and another signal (for example, another RS). The TCI state may be configured (indicated) by higher layer signaling, physical layer signaling, or a combination thereof.

In the present disclosure, the higher layer signaling may be any of, for example, radio resource control (RRC) signaling, medium access control (MAC) signaling, broadcast information, and the like, or a combination thereof.

For the MAC signaling, for example, a MAC control element (MAC CE), a MAC protocol data unit (PDU), or the like may be used. The broadcast information may be, for example, a master information block (MIB), a system information block (SIB), remaining minimum system information (RMSI), other system information (OSI), or the like.

The physical layer signaling may be, for example, downlink control information (DCI).

A channel for which a TCI state or spatial relation is configured (specified) may be, for example, at least one of a Physical Downlink Shared Channel (PDSCH), a Physical Downlink Control Channel (PDCCH), a Physical Uplink Shared Channel (PUSCH), and a Physical Uplink Control Channel (PUCCH).

Furthermore, an RS having a QCL relation with the channel may be, for example, at least one of a Synchronization Signal Block (SSB), a Channel State Information Reference Signal (CSI-RS)), a measurement reference signal (Sounding Reference Signal (SRS)), a tracking CSI-RS (also referred to as a Tracking Reference Signal (TRS)), and a QCL detection reference signal (also referred to as a QRS).

The SSB is a signal block including at least one of a Primary Synchronization Signal (PSS), a Secondary Synchronization Signal (SSS), or a Physical Broadcast Channel (PBCH). The SSB may be referred to as an SS/PBCH block.

The UE may receive, by higher layer signaling, configuration information (for example, PDSCH-Config, tci-StatesToAddModList) including a list of information elements of the TCI state.

An information element of a TCI state configured by higher layer signaling ("TCI-state IE" of RRC) may include a TCI state ID and one or more pieces of QCL information ("QCL-Info"). The QCL Information may include at least one of information regarding the RS having the QCL relation (RS related information) and information indicating a QCL type (QCL type information). The RS related information may include information such as an index of the RS (for example, an SSB index or a non-zero-power (NZP) CSI-RS resource identifier (ID)), an index of a cell where the RS is located, or an index of a bandwidth part (BWP) where the RS is located.

In Rel. 15 NR, both an RS of the QCL type A and an RS of the QCL type D, or only the RS of the QCL type A may be configured for the UE as a TCI state of at least one of the PDCCH or the PDSCH.

When the TRS is set as the RS of the QCL type A, in the TRS, different from a Demodulation Reference Signal (DMRS) of the PDCCH or the PDSCH, it is assumed that the same TRS is periodically transmitted for a long time. The UE can measure the TRS and calculate an average delay, a delay spread, and the like.

In the UE for which the TRS is configured as the RS of the QCL type A in the TCI state of the DMRS of the PDCCH or the PDSCH, it can be assumed that parameters (the average delay, the delay spread, and the like) of the QCL type A are the same between the DMRS of the PDCCH or the PDSCH and the TRS, and thus, the parameters (the average delay, the delay spread, and the like) of the type A of the DMRS of the PDCCH or the PDSCH can be obtained from a measurement result of the TRS. When performing channel estimation of at least one of the PDCCH or the PDSCH, the UE can perform channel estimation with higher accuracy using the measurement result of the TRS.

The UE for which the RS of the QCL type D is configured can determine a UE reception beam (spatial domain reception filter, UE spatial domain reception filter) by using the RS of the QCL type D.

An RS of QCL type X in a TCI state may mean an RS in a QCL type X relation with (DMRS of) a certain channel/signal, and this RS may be referred to as a QCL source of QCL type X in the TCI state.

<TCI State for PDCCH>

Information regarding the QCL between the PDCCH (or the DMRS antenna port associated with the PDCCH) and a certain RS may be referred to as a TCI state or the like for the PDCCH.

The UE may determine a TCI state for a UE-specific PDCCH (CORESET) on the basis of higher layer signaling.

For example, for the UE, one or a plurality of (K) TCI states may be configured by RRC signaling for each CORESET.

In the UE, one of the plurality of TCI states configured by the RRC signaling may be activated by a MAC CE, for each CORESET. The MAC CE may be referred to as a TCI state indication MAC CE for a UE specific PDCCH (TCI State Indication for UE-specific PDCCH MAC CE). The UE may monitor a CORESET on the basis of an active TCI state corresponding to the CORESET.

<TCI State for PDSCH>

The information regarding the QCL between the PDSCH (or the DMRS antenna port related to the PDSCH) and a certain DL-RS may be referred to as a TCI state for the PDSCH or the like.

The UE may notify (configure) M (M≥1) TCI states for PDSCH (QCL information for M PDSCHs) by higher layer signaling. Note that the number M of TCI states configured in the UE may be limited by at least one of the UE capability and the QCL type.

DCI used for PDSCH scheduling may include a field (which may be referred to as, for example, a TCI field, a TCI state field, or the like) indicating a TCI state for the PDSCH. The DCI may be used for scheduling the PDSCH of one cell, and may be referred to as, for example, DL DCI, DL assignment, DCI format 1_0, DCI format 1_1, or the like.

Whether or not the TCI field is included in the DCI may be controlled by information of which the UE is notified from the base station. The information may be information (for example, TCI existence information, TCI existence information in DCI, higher layer parameter TCI-PresentIn-DCI) indicating whether the TCI field is present or absent in the DCI. The information may be configured in the UE by, for example, higher layer signaling.

When more than eight types of TCI states are configured in the UE, MAC CE may be used to activate (or specify) eight or less types of TCI states. The MAC CE may be referred to as a TCI state activation/deactivation MAC CE for UE specific PDSCH (TCI States Activation/Deactivation for UE-specific PDSCH MAC CE). A value of the TCI field in the DCI may indicate one of the TCI states activated by MAC CE.

In a case where the TCI presence information configured as "enabled" is configured in the UE for a CORESET for scheduling a PDSCH (CORESET used for PDCCH transmission for scheduling the PDSCH), the UE may assume that the TCI field is present in the DCI format 1_1 of the PDCCH transmitted on the CORESET.

In a case where the TCI presence information is not configured for the CORESET for scheduling a PDSCH, or the PDSCH is scheduled by the DCI format 1_0, in a case where a time offset between reception of DL DCI (DCI for scheduling the PDSCH) and reception of a PDSCH corresponding to the DCI is greater than or equal to a threshold value, the UE, to determine QCL of a PDSCH antenna port, may assume that a TCI state or a QCL assumption for the PDSCH is the same as a TCI state or a QCL assumption applied to a CORESET used for PDCCH transmission for scheduling the PDSCH.

When the TCI existence information is set to "enabled", the TCI field in the DCI in the component carrier (CC) scheduling (PDSCH) indicates the activated TCI state in the scheduled CC or DL BWP, and when the PDSCH is scheduled according to DCI format 1_1, the UE may use the TCI with the DCI and according to the value of the TCI field in the detected PDCCH to determine the QCL of the PDSCH antenna port. When the time offset between the reception of the DL DCI (scheduling the PDSCH) and the PDSCH corresponding to the DCI (PDSCH scheduled by the DCI) is greater than or equal to the threshold, the UE may assume that the DM-RS port of the PDSCH of the serving cell is the RS and QCL in the TCI state with respect to the QCL type parameter given by the indicated TCI state.

If the UE is configured with a single-slot PDSCH, the indicated TCI state may be based on the activated TCI state in the slot with the scheduled PDSCH. If the UE is configured with a multi-slot PDSCH, the indicated TCI state may be based on the activated TCI state in the first slot with the scheduled PDSCH and the UE may expect to be identical across the slots with the scheduled PDSCH. When the UE is configured with a CORESET associated with a search space set for cross-carrier scheduling, the UE may assume that for the CORESET, the TCI existence information is set to "enabled", and when at least one of the TCI states configured for the serving cell scheduled by the search space set includes a QCL type D, the UE may assume that a time offset between the detected PDCCH and a PDSCH corresponding to the PDCCH is greater than or equal to a threshold.

In both a case where the TCI information in the DCI (higher layer parameter TCI-PresentInDCI) is set to "enabled" and a case where the TCI information in the DCI is not configured in the RRC connection mode, when the time offset between reception of DL DCI (DCI for scheduling the PDSCH) and the corresponding PDSCH (PDSCH scheduled by the DCI) is less than the threshold (application condition, first condition), the UE may assume that the DM-RS port of the PDSCH of the serving cell has a minimum (lowest) CORESET-ID in a newest (latest) slot in which one or more CORESETs in an active BWP of the serving cell are monitored by the UE, and is in QCL with the RS related to a QCL parameter used for QCL indication of the PDCCH of the CORESET associated with a monitored search space. This RS may be referred to as a default TCI state of the PDSCH or a default QCL assumption of the PDSCH.

The time offset between the reception of the DL DCI and the reception of the PDSCH corresponding to the DCI may be referred to as a scheduling offset.

Furthermore, the threshold may be referred to as a time duration for QCL, "timeDurationForQCL", "Threshold", "Threshold for offset between a DCI indicating a TCI state and a PDSCH scheduled by the DCI", "Threshold-Sched-Offset", a schedule offset threshold, a scheduling offset threshold, or the like.

The time duration for QCL may be based on UE capability, for example, may be based on a delay required for decoding and beam switching of the PDCCH. The time duration for QCL may be the minimum time required for the UE to perform PDCCH reception and application of spatial QCL information received in the DCI for PDSCH processing. The time duration for QCL may be represented by the number of symbols for each subcarrier interval or may be represented by time (for example, μs). The information of the time duration for QCL may be reported from the UE to the base station as UE capability information, or may be configured from the base station to the UE using higher layer signaling.

For example, the UE may assume that the DMRS ports of the PDSCH are QCL with the DL-RS based on the TCI state activated for the CORESET corresponding to the lowest CORESET-ID. The latest slot may be, for example, a slot for receiving DCI for scheduling the PDSCH.

Note that the CORESET-ID may be an ID (ID for CORESET identification, controlResourceSetId) configured by the RRC information element "ControlResourceSet".

When no CORESET is configured for the CC (of PDSCH), the default TCI state may be an activated TCI state applicable to the PDSCH in the active DL BWP for the CC and having the lowest ID.

After Rel. 16, in a case where the PDSCH and the PDCCH scheduling the PDSCH are in different component carriers (CCs) (cross-carrier scheduling), if the delay from the PDCCH to the PDSCH (PDCCH-to-PDSCH delay) is shorter than the time duration for QCL, or if the TCI state is not in the DCI for the scheduling, the UE may obtain a QCL assumption for the scheduled PDSCH from the active TCI state applicable to the PDSCH in the active BWP for the scheduled cell and having the lowest ID.

(NR Multicast/Broadcast)

In the NR up to Rel. 16, transmission of at least one of a signal and a channel (hereinafter, expressed as a signal/channel) from the NW to the UE is basically a unicast transmission. In this case, it is assumed that each UE receives the same downlink (DL) data signal/channel (for example, the downlink shared channel (PDSCH)) transmitted from the NW to a plurality of UEs by using a plurality of reception occasions corresponding to a plurality of beams (or the panels) of the NW.

In addition, a case is assumed in which the plurality of UEs simultaneously receives the same signal/channel under an ultra-high density and high traffic situation such as an environment in which a large number of UEs are geographically dense (for example, a stadium or the like). In such a case, if a plurality of UEs exists in the same area and each UE receives the same signal/channel by unicast in order to receive the same signal/channel, it is considered that reliability of communication can be secured, but resource utilization efficiency is reduced.

In order to make UEs receive multicast/broadcast services, a group scheduling mechanism has been studied.

On the other hand, in the existing NR (for example, Rel. 16), the PDSCH configuration (for example, PDSCH-Config) includes UE specific information such as resource allocation (for example, resourceAllocation), a PDSCH time domain allocation list (for example, pdsch-TimeDomainAllocationList), and a PDSCH aggregation factor (for example, pdsch-AggregationFactor).

Operation of group scheduling is not clear. If the group scheduling is not appropriately performed, a decrease in system performance such as a decrease in throughput may be caused. For example, if an existing PDSCH configuration is used for group scheduling, there are many UE specific parameters and configuration overheads increase.

Therefore, the present inventors have conceived an operation of group scheduling.

Hereinafter, embodiments according to the present disclosure will be described in detail with reference to the accompanying drawings.

The radio communication method according to each of the embodiments may be applied independently, or may be applied in combination with others.

(Radio Communication Method)

In the present disclosure, "A/B" and "at least one of A or B" may be interchangeable. In the present disclosure, the cell, the CC, the carrier, the BWP, the active DL BWP, the active UL BWP, and the band may be replaced with each other. In the present disclosure, the index, the ID, the indicator, and the resource ID may be replaced with each other. In the present disclosure, an RRC parameter, a higher layer parameter, an RRC information element (IE), and an RRC message may be replaced with each other.

In the present disclosure, the higher layer signaling may be any of, for example, radio resource control (RRC) signaling, medium access control (MAC) signaling, broadcast information, and the like, or a combination thereof.

For the MAC signaling, for example, a MAC control element (MAC CE), a MAC protocol data unit (PDU), or the like may be used. The broadcast information may be, for example, a master information block (MIB), a system information block (SIB), remaining minimum system information (RMSI), other system information (OSI), or the like.

The physical layer signaling may be, for example, downlink control information (DCI).

In the present disclosure, multicast and broadcast (notification) may be replaced with each other. In addition, the PDSCH using multicast, the PDSCH common to a plurality of UEs, the common PDSCH, the shared PDSCH, the multicast PDSCH, and the broadcast PDSCH may be read as each other.

In the present disclosure, the DL data, the code word (CW), the transport block (TB), and the PDSCH may be replaced with each other.

In the present disclosure, the beam, the TCI state, the QCL assumption, the QCL parameter, the spatial domain reception filter, the UE spatial domain reception filter, the UE reception beam, the DL reception beam, the DL precoding, the DL precoder, the DL-RS, the RS of QCL type D of the TCI state or the QCL assumption, and the RS of QCL type A of the TCI state or the QCL assumption may be replaced with each other. In the present disclosure, the QCL type X-RS, the DL-RS associated with QCL type X, the DL-RS with QCL type X, a source of the DL-RS, the SSB, and the CSI-RS may be replaced with each other.

In the present disclosure, X is quasi co-located ((QCLed)) with Y, X and Y are quasi co-located with 'QCL-TypeD', X and Y are quasi co-located with respect to 'QCL-TypeD', and X and Y are in a relation of QCL type D may be replaced with each other. X and Y may be RS or RS resources.

First Embodiment

One piece of DCI may schedule DL data for a plurality of UEs. One piece of DCI may schedule the same DL data in a plurality of reception occasions.

Suitable beams (best beams) may be different in the plurality of UEs. The plurality of reception occasions may be associated with each of a plurality of QCL parameters (e.g., beam, QCL assumption, TCI state). DL data at each reception occasion may be transmitted (received) using corresponding QCL parameters.

In the example of FIG. 1, one piece of DCI schedules the same DL data at reception occasions (occasions) #0 to #3. DL data in the occasions #0, #1, #2, and #3 are transmitted (received) using QCL parameters (QCL) #0, #1, #2, and #3, respectively. The DCI is transmitted to all UEs. DL data at the occasion #0 is transmitted to the UEs #0 and #1. DL data at the occasion #1 is transmitted to the UE #2. DL data at the occasion #2 is transmitted to the UE #3. DL data at the occasion #3 is transmitted to the UE #4.

The DCI may be transmitted in the common search space or may be transmitted in the group common search space. Depending on the QCL used for the UE, the PDCCH monitoring occasion for the DCI may be different. The UE may select the PDCCH monitoring occasion based on a plurality of QCL assumptions.

One piece of DL data may be one code word (CW) or one transport block (TB). The same DL data may have the same size (for example, the transport block size (TBS)) or different sizes.

It may be assumed that the base station does not simultaneously transmit the DL data by using the plurality of beams.

Hereinafter, an example in which the RRC parameters in the second and third embodiments are configured in the PDSCH configuration will be described, but the RRC parameters in the second and third embodiments may be configured in the PDCCH configuration (for example, PDCCH-Config). For example, a search space for multicast PDSCH may be specified in the specification, and the RRC parameters in the second and third embodiments may be configured in the configuration of the search space.

According to the first embodiment described above, the UE can appropriately receive at least one piece of the plurality of pieces of DL data at the plurality of reception occasions.

Second Embodiment

<<Association Between Reception Occasion and QCL Assumption.

One piece of DCI may schedule multiple reception occasions for DL data and the UE may receive the DL data at the reception occasions corresponding to the QCL assumption.

The UE may be configured/indicated by at least one of the RRC parameter, the MAC CE and the DCI to configure an association between the reception occasion and the QCL assumption (QCL parameter information). For example, multiple associations may be configured by the RRC parameter, and one of the multiple associations may be activated by the MAC CE.

The UE may be configured/indicated to associate between the reception occasion and the QCL assumption by any of the following QCL assumption configuration/indication manners 1 and 2.

[QCL Assumption Configuration/Indication Manner 1]

For example, as illustrated in FIG. 2A, a list of reception occasions for DL data may be configured for each PDSCH configuration. A QCL assumption may be configured for each reception occasion. The QCL assumption may be an index or ID of a corresponding SSB/CSI-RS/TRS/TCI state.

[QCL Assumption Configuration/Indication Manner 2]

For example, as illustrated in FIG. 2B, a QCL assumption for the first occasion #0 for DL data may be configure for each PDSCH configuration. QCL assumptions for the remaining occasions may be implicitly configured (or derived).

For example, if SSB #0 is configured as a QCL assumption for the occasion #0, the UE derives the QCL assumption for the remaining occasions (SSB #1 as a QCL assumption for the occasion #1, SSB #2 as a QCL assumption for the occasion #2, and SSB #3 as a QCL assumption for the occasion #3, . . . ) by incrementing the index of the SSB/CSI-RS/TRS/TCI state.

<<Reception Occasion Determination Method>>

Figure 3:
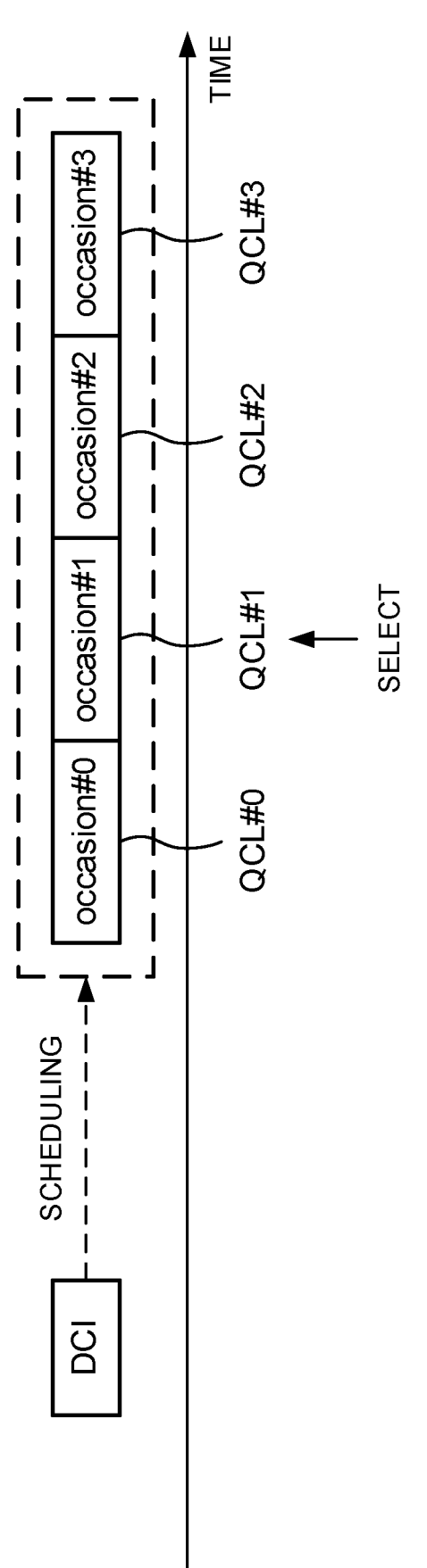
FIG. 3 is a diagram illustrating an example of selection of a reception occasion.

For example, as illustrated in FIG. 3, the UE may select one or more reception occasions for DL data based on the QCL assumption.

The UE may select a QCL assumption according to at least one of the following QCL assumption determination methods 1 to 5.

[QCL Assumption Determination Method 1]

The QCL assumption may be an SSB index corresponding to a recent PRACH transmission occasion.

[QCL Assumption Determination Method 2]

The QCL assumption may be a QCL assumption of the DCI. The DCI, the DCI for scheduling the DL data, and the PDCCH monitoring occasion of the common search space may be replaced with each other.

[QCL Assumption Determination Method 3]

The QCL assumption may be the best beam for (recent) L1-RSRP/L1-SINR beam report.

[QCL Assumption Determination Method 4]

The QCL assumption may be the best beam identified by the UE using L1-RSRP/L1-SINR beam measurement. This best beam may not be reported.

[QCL Assumption Determination Method 5]

QCL assumptions may depend on UE implementation.

Which one of QCL assumption determination methods 1 to 5 is used may be specified in the specification, may be configured by higher layer signaling, or may be reported as UE capability.

According to the second embodiment described above, the UE can appropriately determine the DL data corresponding to the QCL assumption among the plurality of pieces of DL data in the plurality of reception occasions.

Third Embodiment

<<Association Between Reception Occasion and PDSCH Resource>

The UE may be configured/indicated by at least one of the RRC parameter, the MAC CE and the DCI to configure an association between the reception occasion and the PDSCH resource (resource information). For example, multiple associations may be configured by the RRC parameter, and one of the multiple associations may be activated by the MAC CE.

The PDSCH resource may be configured according to any one of the following resource configuration/indication methods 1 and 2.

[Resource Configuration/Indication Method 1]

For example, as illustrated in FIG. 4A, a list of reception occasions for DL data may be configured for each PDSCH configuration. A PDSCH resource may be configured for each reception occasion. The PDSCH resource may be configured by at least one of time domain resource allocation (TDRA) and frequency domain resource allocation (FDRA).

[Resource Configuration/Indication Method 2]

For example, as illustrated in FIG. 4B, the PDSCH resource may be configured for one reception occasion. One reception occasion may be the first reception occasion or the last reception occasion. A PDSCH resource for the first reception occasion of the DL data may be configured for each PDSCH configuration. The PDSCH resource for the remaining reception occasions may be implicitly configured (or derived).

If the relationship between the time domain (TD) resource of the $(m-1)$th reception occasion and the TD resource of the $m$th reception occasion is determined by the time offset $T_{offset}$, the frequency domain (FD) resource of the $m$th reception occasion may be the same as the FD resource of the $(m-1)$th reception occasion.

The $T_{offset}$ may be defined by the specification, may be configured by an RRC parameter, or may be determined by UE capability report.

$T_{offset}$ may be a time from the start of the TD resource of the (m−1)th reception occasion to the start of the TD resource of the mth reception occasion, or may be a time from the end of the TD resource of the (m−1)th reception occasion to the start of the TD resource of the mth reception occasion.

Figures 5A, 5B:
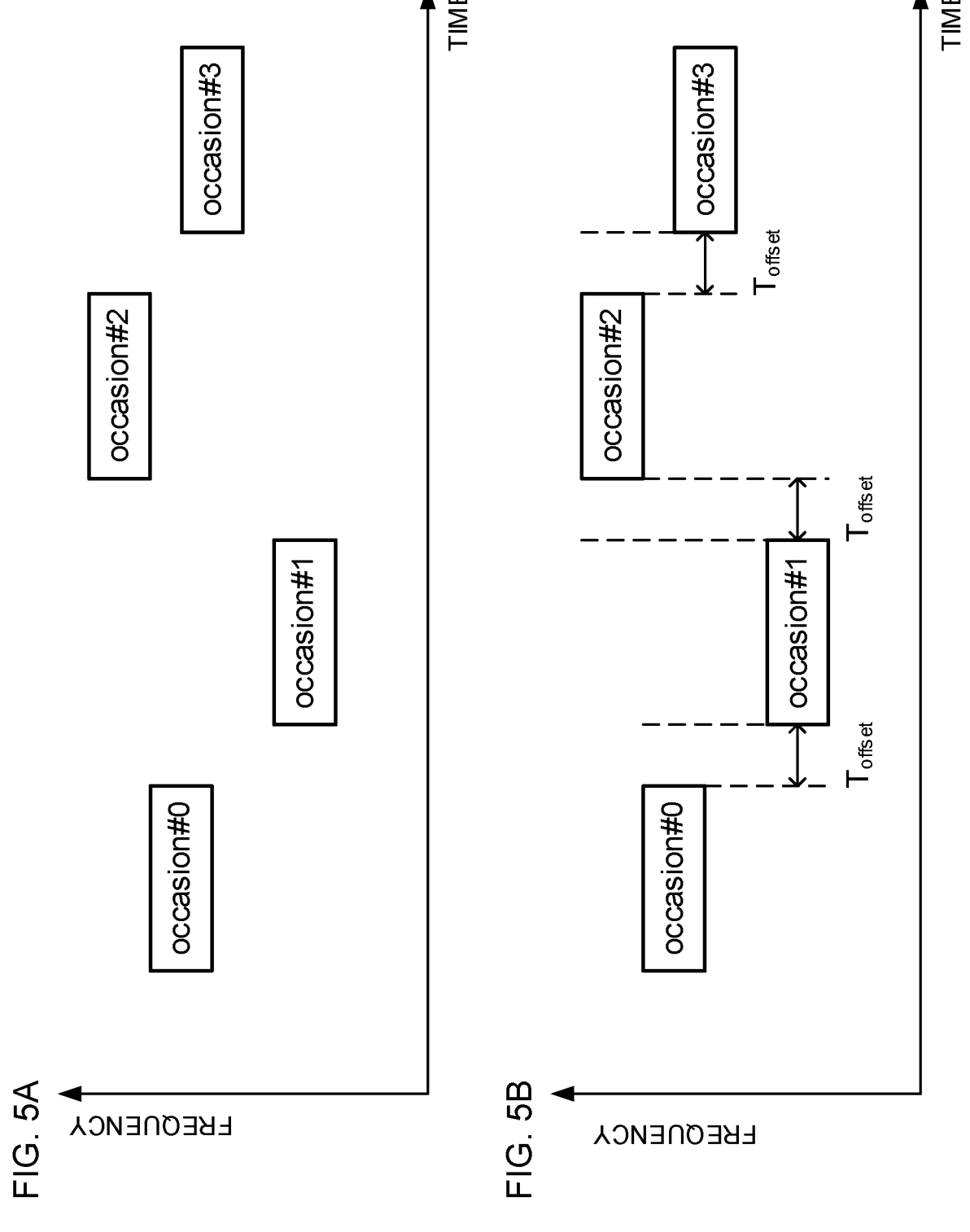
FIGS. 5A and 5B are diagrams illustrating an example of a resource configuration/indication method 1.

In the example of FIG. 5A, in the resource configuration/indication method 1, both the TDRA and the FDRA of the PDSCH are configured for each reception occasion. According to this example, the PDSCH resource of each reception occasion can be flexibly configured.

In the example of FIG. 5B, in the resource configuration/indication method 1, the FDRA of the PDSCH is configured for each reception occasion. The TDRA of the first reception occasion is configured, and the TDRAs of the second and subsequent reception occasions are not configured and are derived based on $T_{offset}$.

In the example of FIG. 6A, in the resource configuration/indication method 2, a frequency domain resource of the first reception occasion is configured and used to determine the remaining reception occasions. Here, $T_{offset}$ is a time (interval) from the end of the TD resource of the (m−1)th reception occasion to the start of the TD resource of the mth reception occasion.

A relationship between the frequency domain resource of the (m−1)th reception occasion and the FD resource of the mth reception occasion may be determined by the frequency offset $F_{offset}$.

The $F_{offset}$ may be defined by the specification, may be configured by an RRC parameter, or may be determined by UE capability report.

The $F_{offset}$ may be an index (number, the number of PRBs) from the lowest frequency of the FD resource of the (m−1)th reception occasion to the lowest frequency of the FD resource of the mth reception occasion, or may be an index (number, interval, the number of PRBs) from the highest frequency of the FD resource of the (m−1)th reception occasion to the lowest frequency of the FD resource of the mth reception occasion.

In the example of FIG. 6B, in the resource configuration/indication method 2, $T_{offset}$ is a time (interval) from the end of the TD resource of the (m−1)th reception occasion to the start of the TD resource of the mth reception occasion. $F_{offset}$ is a PRB index (the number of PRBs) from the lowest frequency (first PRB index) of the FD resource of the (m−1)th reception occasion to the lowest frequency (first PRB index) of the FD resource of the mth reception occasion.

<<TDRA/FDRA>>

The value of TDRA/FDRA may be according to any of the following definitions 1 and 2.

[Definition 1]

The definition of the value of TDRA/FDRA of the second and subsequent reception occasions may be similar to the definition of the value of TDRA/FDRA of the first reception occasion.

Figure 7:
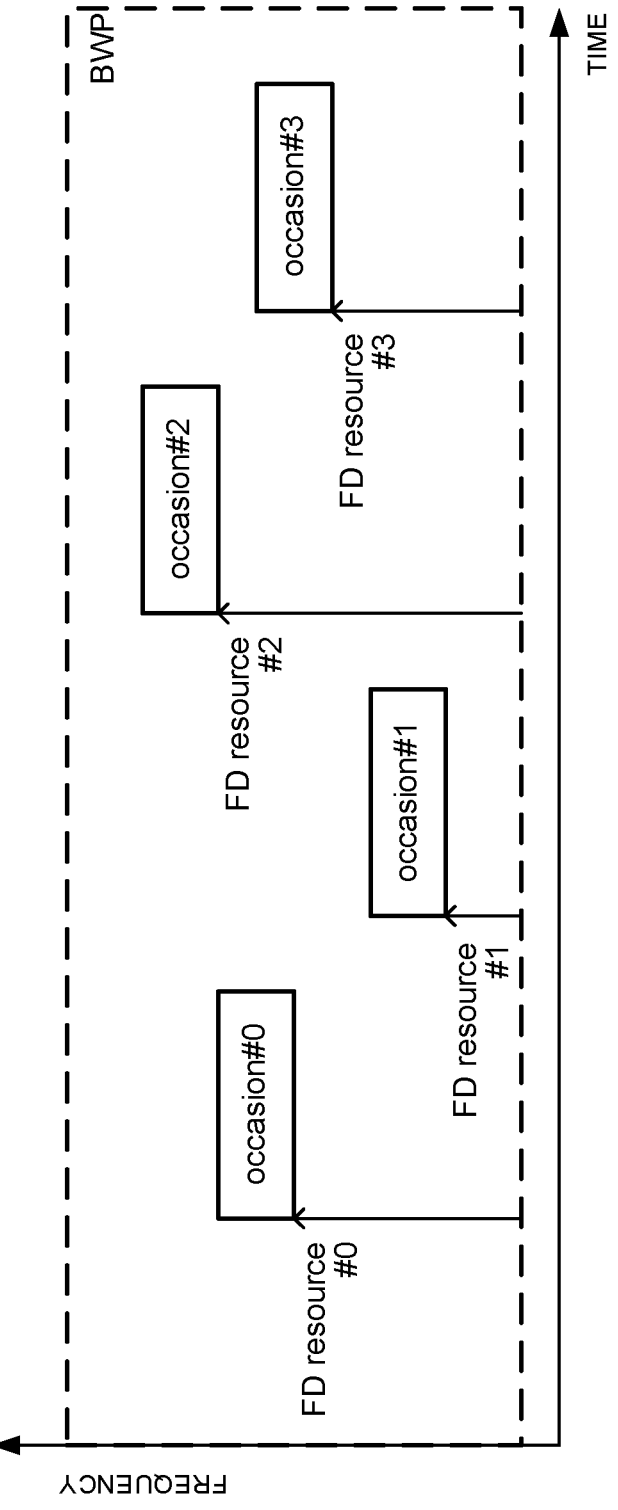
FIG. 7 is a diagram illustrating an example of the FDRA according to a first definition.

For example, as illustrated in FIG. 7, each FD resource of the occasions #0 to #3 may be represented as a PRB index (the number of PRBs) from the first PRB index of the BWP.

The TD resource may be represented as a time (for example, at least one of the number of slots, the number of symbols, a time [ms], and a start and length indicator value (SLIV)) from the scheduling DCI (start or end).

[Definition 2]

The definition of the value of TDRA/FDRA of the second and subsequent reception occasions may be different from the definition of the value of TDRA/FDRA of the first reception occasion.

The TD/FD resource of the m (m≥2)th reception occasion may be represented as a difference (relative value) from the TD/FD resource of the first reception occasion.

Figure 8:
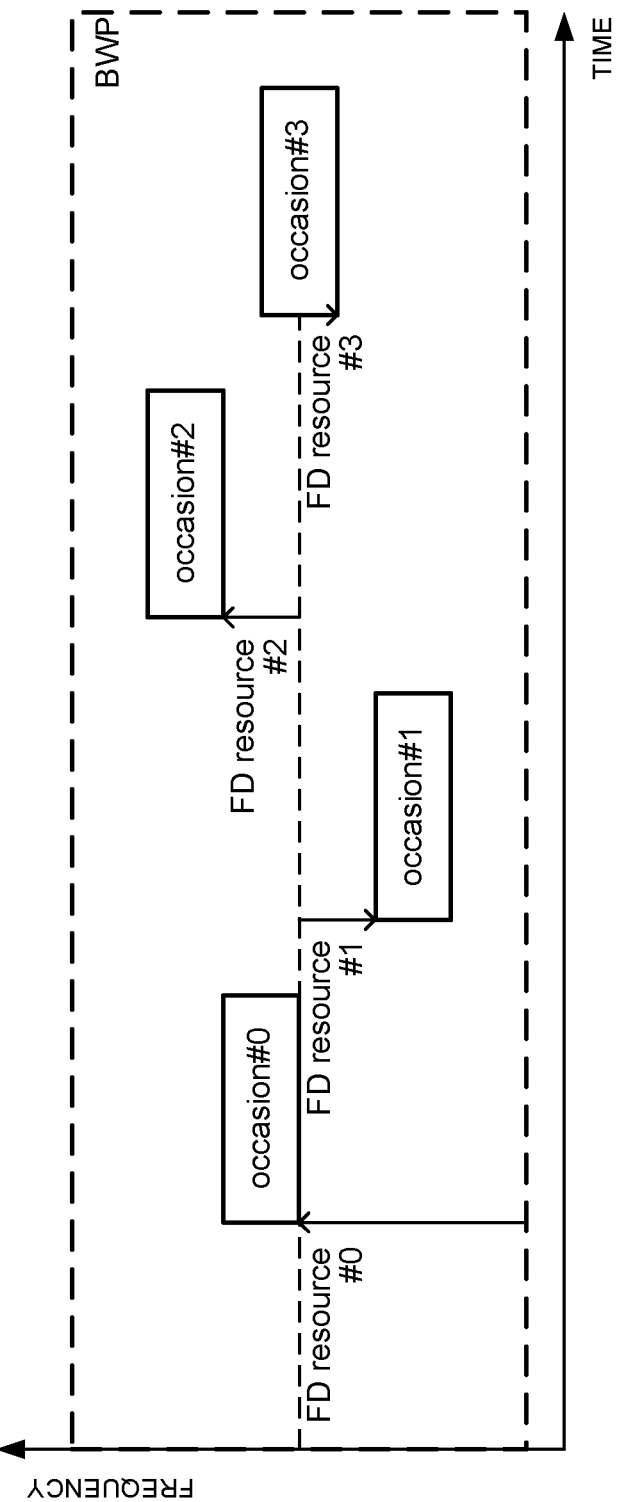
FIG. 8 is a diagram illustrating an example of the FDRA according to a second definition.

For example, as illustrated in FIG. 8, the first PRB index of the FD resource of the occasion #0 is represented as a PRB index from the first PRB index of the BWP. The first PRB index of the FD resource of each of the occasions #1, #2, #3 is represented as a PRB index from the first PRB index of the FD resource of the occasion #0.

The TD/FD resource of the m (m≥2)th reception occasion may be represented as a difference (relative value) from the TD/FD resource of the (m−1)th reception occasion.

Figure 9:
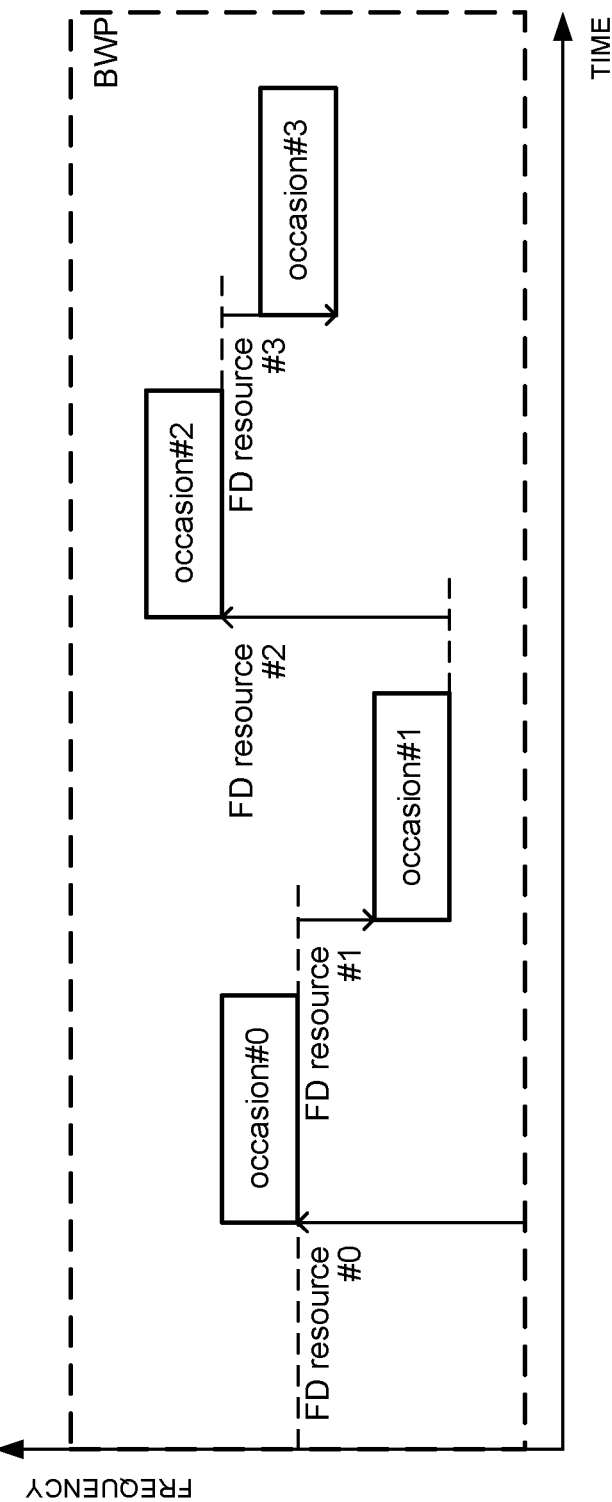
FIG. 9 is a diagram illustrating another example of the FDRA according to the second definition.

For example, as illustrated in FIG. 9, the first PRB index of the FD resource of the occasion #0 is represented as a PRB index from the first PRB index of the BWP. The first PRB index of the FD resource of the occasion #m (m=1, 2, 3) is represented as a PRB index from the first PRB index of the FD resource of the occasion #(m−1).

<<PDSCH Configuration>>

The following at least one parameter for PDSCH may be common to all reception occasions.

Data scrambling identification information (for example, dataScramblingIdentityPDSCH)

Downlink DMRS for PDSCH mapping type A (for example, dmrs-DownlinkForPDSCH-MappingTypeA)

Downlink DMRS for PDSCH mapping type B (for example, dmrs-DownlinkForPDSCH-MappingTypeB)

Virtual Resource Block (VRB)-Physical Resource Block (PRB) Interleaver (for example, vrb-ToPRB-Interleaver)

PDSCH Aggregation Factor (for example, pdsch-AggregationFactor)

Additional change rate match pattern list (for example, rateMatchPatternToAddModList)

Release Rate Matching Pattern List (for example, rateMatchPatternToReleaseList)

Rate match pattern group 1 (for example, rateMatchPatternGroup1)

Rate match pattern group 2 (for example, rateMatchPatternGroup2)

Resource block group (RBG) size (for example, rbg-Size)

Modulation and coding scheme (MCS) table (for example, mcs-Table)

Maximum number of codewords scheduled by the DCI (for example, maxNrofCodeWordsScheduledByDCI)

PRB bundling type (for example, prb-BundlingType)

Additional modification zero power (ZP)-CSI-RS resource set list (for example, zp-CSI-RS-ResourceToAddModList)

ZP-CSI-RS resource set list for release (for example, zp-CSI-RS-ResourceToReleaseList)

Additional Modified Aperiodic Zero Power (ZP)-CSI-RS Resource Set List (for example, aperiodic-ZP-CSI-RS-ResourceSetsToAddModList)

Release aperiodic ZP-CSI-RS resource set list (for example, aperiodic-ZP-CSI-RS-ResourceSetsToReleaseList)

Semi-persistent for addition change (SP)-ZP-CSI-RS resource set list (for example, sp-ZP-CSI-RS-ResourceSetsToAddModList)

SP-ZP-CSI-RS resource set list for release (for example, sp-ZP-CSI-RS-ResourceSetsToReleaseList)

Periodic-ZP-CSI-RS resource set (for example, p-ZP-CSI-RS-ResourceSet)

The parameter common to all reception occasions may be a parameter other than the FDRA, TDRA, and TCI states in the PDSCH configuration.

According to the third embodiment described above, the UE can appropriately determine the PDSCH resource of each of the plurality of reception occasions.

Fourth Embodiment

For the multicast PDSCH, the existence of the TCI in the DCI (presence of TCI in the DCI, e.g. tci-PresentInDCI) may not be configured.

The presence of TCI in the DCI may be configured for multicast PDSCH. The active TCI state for PDSCH may be configured/notified for each reception occasion and a value of one of the fields (for example, the TCI field) in the DCI may indicate the TCI state for all reception occasions. A field in the DCI may indicate a value for each reception occasion. If three bits are used for the TCI state of one reception occasion and four reception occasions are scheduled, the size of the field may be 3×4=12 bits.

The UE may select the reception occasion for the PDSCH based on the QCL assumption, and use the TCI state indicated by the scheduling DCI for receiving the DMRS of the PDSCH (may be assumed that the DMRS of the PDSCH is quasi co-located with the indicated TCI state). According to this operation, for example, when a certain cell is operated using a wide beam for transmission of the SSB and using a thinner beam than the SSB for transmission of the CSI-RS, the beam can be controlled more appropriately.

Figure 10:
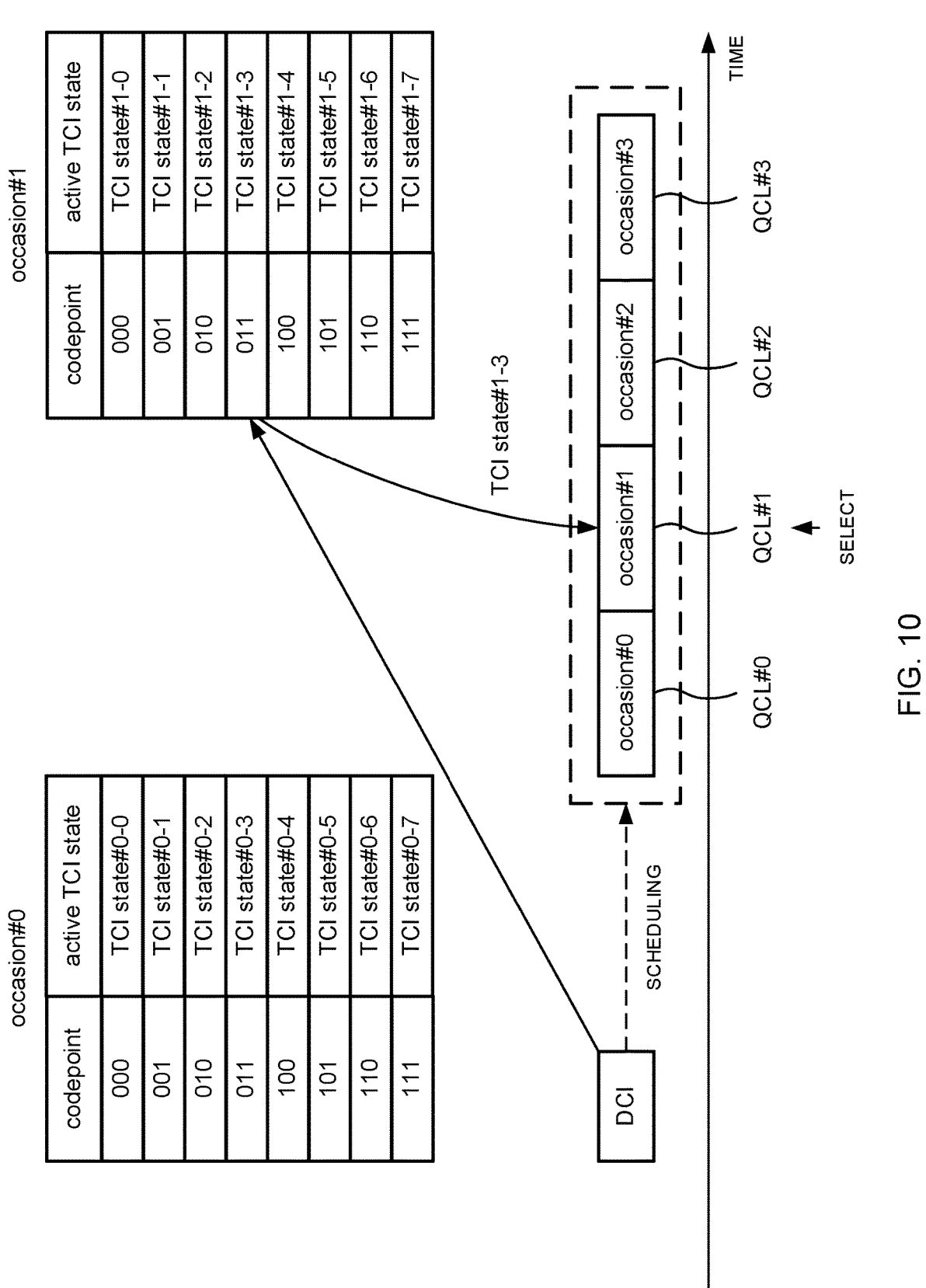
FIG. 10 is a diagram illustrating an example of a determination method of a TCI state according to a fourth embodiment.

In the example of FIG. 10, a plurality of TCI states is activated for each of the occasions #0 to #3. The UE determines QCL #1 as the QCL assumption, and determines the occasion #1 corresponding to the QCL assumption. The scheduling DCI of the PDSCH indicates TCI state #1-3. In the occasion #1, the UE uses the TCI state #1-3 indicated to receive the DMRS of the PDSCH.

According to the fourth embodiment described above, the UE can appropriately determine the TCI state used for reception of the PDSCH DMRS in the reception occasion.

Fifth Embodiment

A plurality pieces of DCI may schedule each of the plurality of reception occasions. The same DL data may be transmitted in each of the plurality of reception occasions.

<<Association of QCL, DCI, and DL Data>>

One DCI using QCL #x may schedule DL data with QCL #x' for the plurality of UEs.

DCI detected at a PDCCH monitoring occasion associated with (corresponding to) a QCL may schedule DL data at a reception occasion associated with the QCL.

Figure 11:
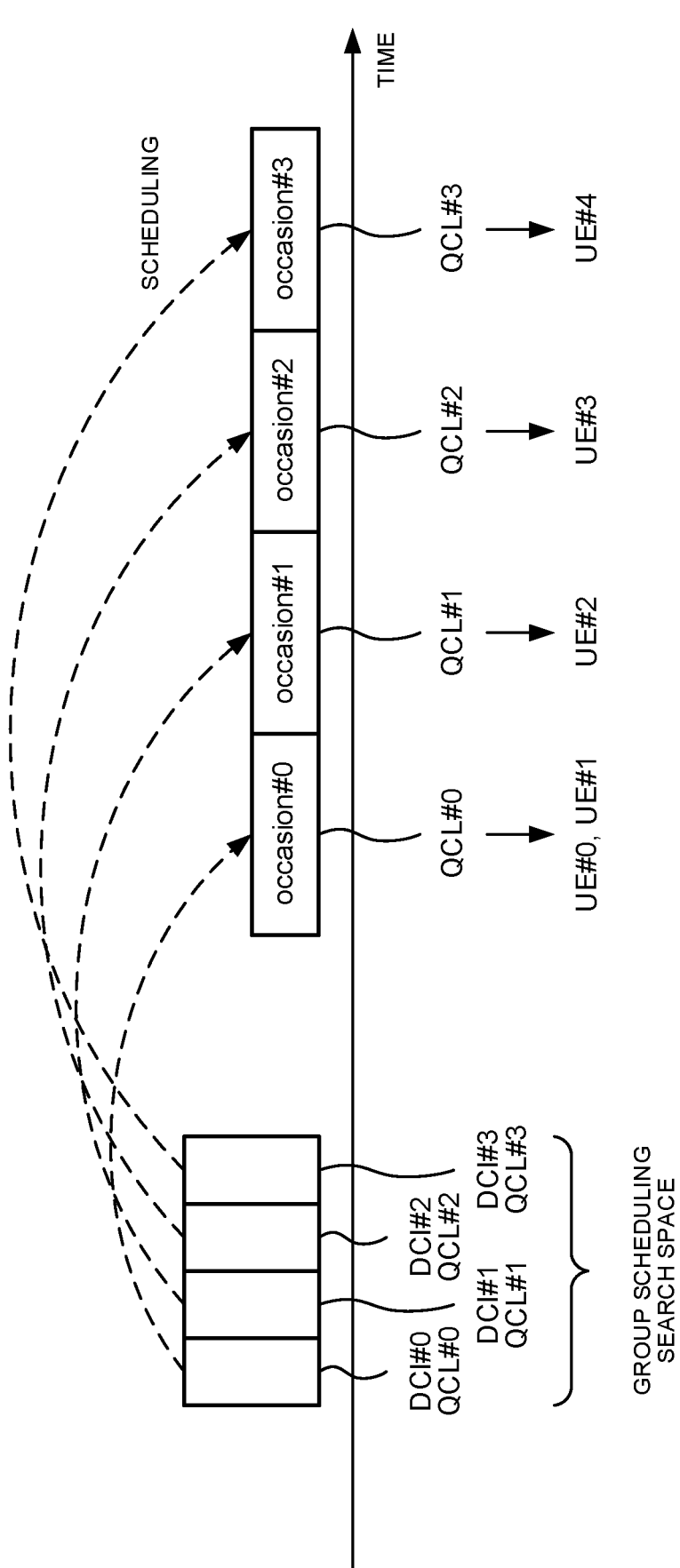
FIG. 11 is a diagram illustrating an example of group scheduling according to a fifth embodiment.

In the example of FIG. 11, DCI #0 to DCI #3 in one search space uses QCL #0 to QCL #3, respectively. The search space is monitored by the UEs #0 to #4. The search space may be a common search space, a group common search space, or a group scheduling search space. The UE may determine the PDCCH monitoring occasion for receiving the DCI depending on the QCL (TCI state) for the PDCCH. The monitoring occasion of the PDCCH may be different depending on the QCL for the PDCCH.

The DCI #0 to #3 schedule the events #0 to #3, respectively. The same DL data is transmitted in the occasions #0 to #3. DL data in the occasions #0, #1, #2, and #3 are transmitted using QCL #0, #1, #2, and #3, respectively. DL data at the occasion #0 is transmitted to the UEs #0 and #1. DL data at the occasion #1 is transmitted to the UE #2. DL data at the occasion #2 is transmitted to the UE #3. DL data at the occasion #3 is transmitted to the UE #4.

<<PDCCH Monitoring>>

The PDCCH monitoring may be in accordance with at least one of the following PDCCH monitoring methods 1 to 3.

[PDCCH Monitoring Method 1]

The plurality pieces of DCI may be transmitted (received) in the common search space or the group common search space. The UE may select the PDCCH monitoring occasion corresponding to the QCL configured/indicated for the PDCCH for reception of the DCI.

Figures 12A, 12B, 12C:
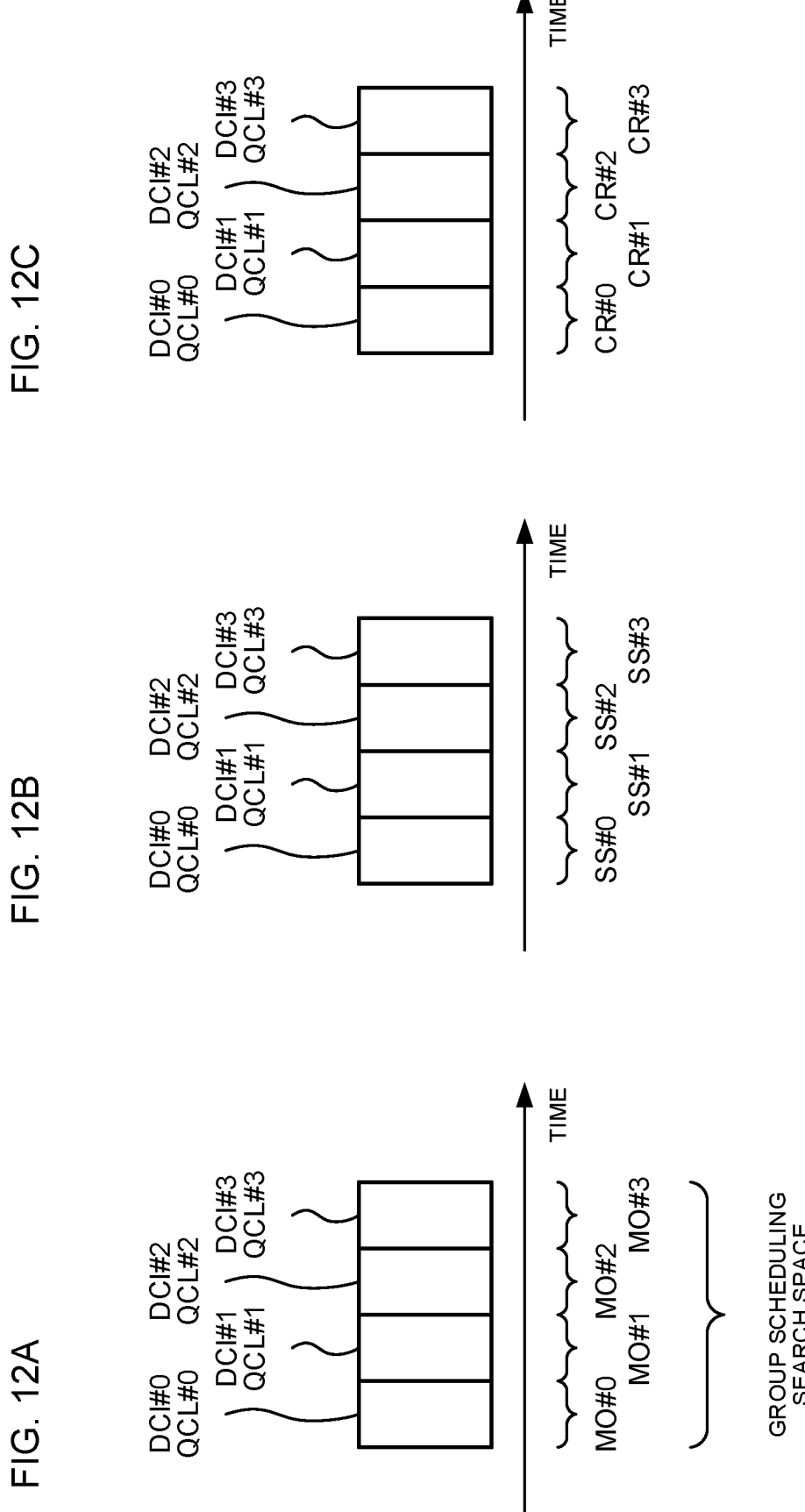
FIGS. 12A to 12C are diagrams illustrating an example of PDCCH monitoring method.

In the example of FIG. 12A, DCI #0 to #3 are transmitted in one search space. The DCI #0 to #3 are transmitted by using QCL #0 to #3, respectively. The DCI #0 to #3 are transmitted in the PDCCH monitoring occasions (MO) #0 to #3, respectively. The UE monitors the DCI in the PDCCH monitoring occasion corresponding to the QCL for the PDCCH.

[PDCCH Monitoring Method 2]

A common search space or a group common search space may be configured for each of the plurality of QCLs. The UE may select a search space corresponding to the QCL configured/indicated for the PDCCH for reception of the DCI.

In the example of FIG. 12B, DCI #0 to DCI #3 are transmitted in search spaces (SS) #0 to #3, respectively. The DCI #0 to #3 are transmitted by using QCL #0 to #3, respectively. The UE monitors the DCI in the search space corresponding to the QCL for the PDCCH.

[PDCCH Monitoring Method 3]

A common CORESET or a group common CORESET may be configured for each of the plurality of QCLs. The UE may select a search space corresponding to the QCL configured/indicated for the PDCCH for reception of the DCI.

In the example of FIG. 12C, DCI #0 to DCI #3 are transmitted in CORESETs (CR) #0 to #3, respectively. The DCI #0 to #3 are transmitted by using QCL #0 to #3, respectively. The UE monitors the DCI in the CORESET corresponding to the QCL for the PDCCH.

The UE detects the DCI by monitoring the group scheduling search space configured as the common search space or the group common search space.

The group scheduling search space may be different depending on the QCL assumption. For example, the group scheduling search space may have different time domain resources (symbols, slots, etc.) depending on the QCL assumption.

The UE may assume that the same DL data is scheduled at each PDCCH monitoring occasion (DCI in each PDCCH monitoring occasion) in the group scheduling search space.

The UE may be configured with the group scheduling search space by higher layer signaling.

In the examples of FIGS. 12A to 12C, the UE only needs to be able to receive the DL data of any of the occasions #0 to #3. In this case, the UE may follow any of the following decoding operations 1 to 3.

[Decoding Operation 1]

The UE may decode all of the DCI #0 to #3, and transmit (report) the HARQ-ACK when the DL data of any one of the occasions #0 to #3 is successfully decoded.

[Decoding Operation 2]

The UE may decode all of the DCI #0 to #3, decode the DL data in one occasion based on the QCL assumption among the occasions #0 to #3, and transmit (report) the HARQ-ACK when the DL data is successfully decoded.

[Decoding Operation 3]

The UE may decode the DCI in one PDCCH monitoring occasion based on the QCL assumption among the DCI #0 to #3, decode the DL data scheduled by the DCI (the DL data in the reception occasion based on the QCL assumption), and transmit (report) the HARQ-ACK when the DL data is successfully decoded.

<<Relationship Between QCL of DCI and QCL of DL Data>>

The relationship between the QCL (x) of the DCI and the QCL (x') of the DL data may be the following relationship 1 or 2.

[Relation 1]

x=x'. The QCL of the PDSCH scheduled by the DCI detected in the group scheduling search space may be equal to the QCL of the DCI.

[Relation 2]

x≠x'. The QCL of the PDSCH scheduled by the DCI detected in the group scheduling search space may be different from the QCL of the DCI. The QCL of each reception occasion of the DL data may be configured/notified/indicated by the RRC parameter/MAC CE/DCI. The QCL of each reception occasion of the DL data may be determined similarly to the second embodiment.

The DCI detected in the group scheduling search space may be the following DCI 1 or 2.

[DCI1]

In the DCI detected in the group scheduling search space, there is no field for the DCI level beam indication (not included). For example, the TCI field for PDSCH may be 0 bits, or the presence of TCI in the DCI (for example, tci-PresentInDCI) may not be configured. When the group scheduling search space is the common search space, DCI 1 may be used.

[DCI2]

If configured, in the DCI detected in the group scheduling search space, there is a field for the DCI level beam indication (included). For example, the TCI field for PDSCH may be 3 bits, or the presence of TCI in the DCI may not be configured. The DCI 2 may be DCI format 1_1. According to the DCI 1, a beam can be indicated by the DCI so that more flexible indication can be performed. In addition, multicast/broadcast coverage improvement can be possible. In addition, high-speed beam control becomes possible for the high-speed moving UE.

<<TCI State Configuration/Activation>>

The configuration/activation of the TCI state list of the PDSCH may be in accordance with to at least one of the following TCI state configuration/activation methods 1 to 3.

[TCI State Configuration/Activation Method 1]

For each PDSCH configuration, the TCI state list for the PDSCH may be configured/activated. For all reception occasions, the TCI state list for the PDSCH may be configured/activated.

The UE may use the same set of active TCI states for PDSCH for all reception occasions. If different QCL parameters are assumed for the plurality of reception occasions, TCI fields in the plurality pieces of scheduling DCI may indicate different code points.

Figure 13:
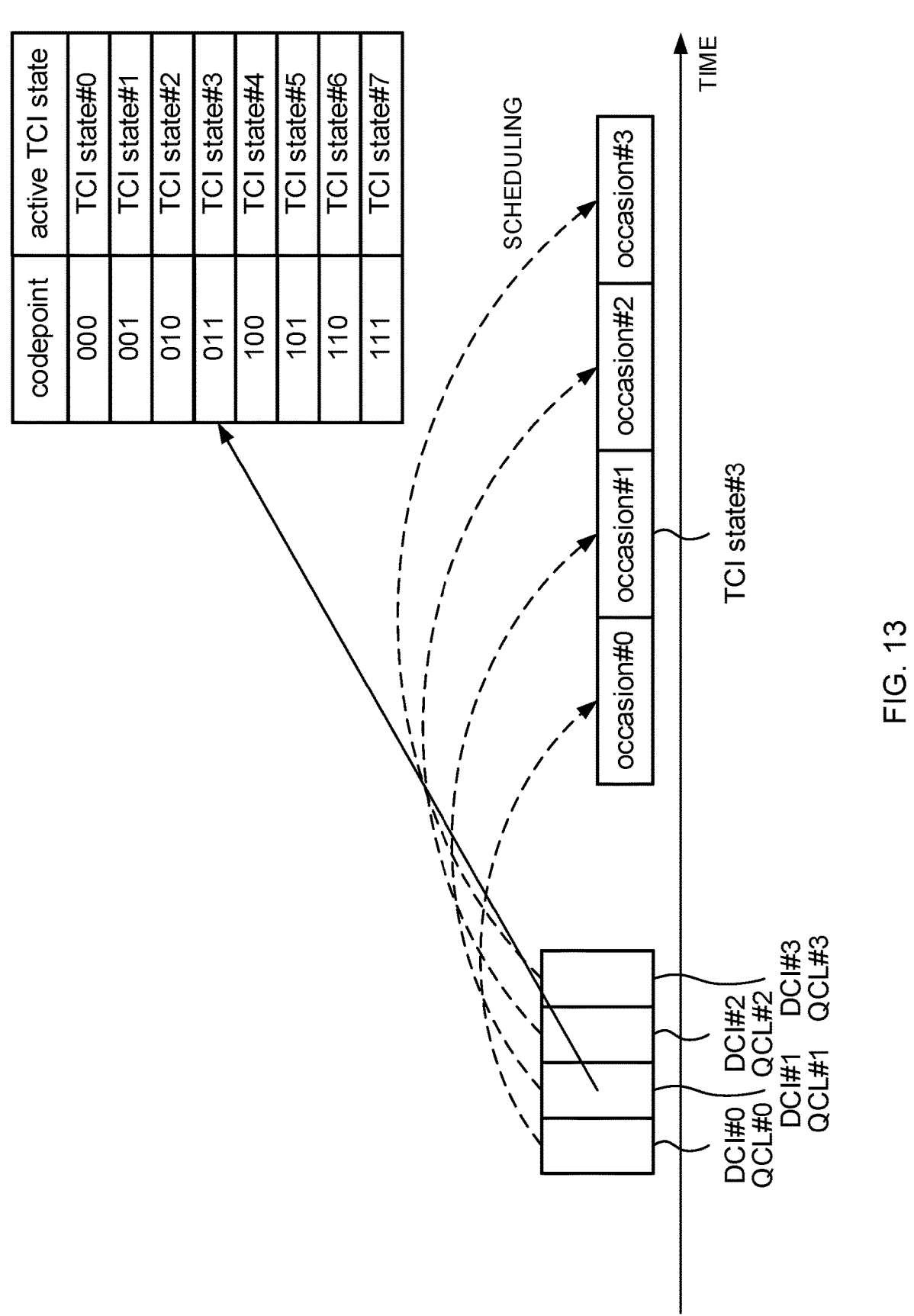
FIG. 13 is a diagram illustrating an example of a TCI state configuration/activation method 1.

In the example of FIG. 13, the TCI states #0 to #7 are activated for the occasions #0 to #3. The TCI field in DCI #1 scheduling the DL data for occasion #1 indicates code point 011. The UE uses the TCI state #3 corresponding to the code point 011 among the activated TCI states #0 to #7 for reception of the DL data of the occasion #1.

[TCI State Configuration/Activation Method 2]

For each reception occasion, the TCI state list for the PDSCH may be configured/activated.

Figure 14:
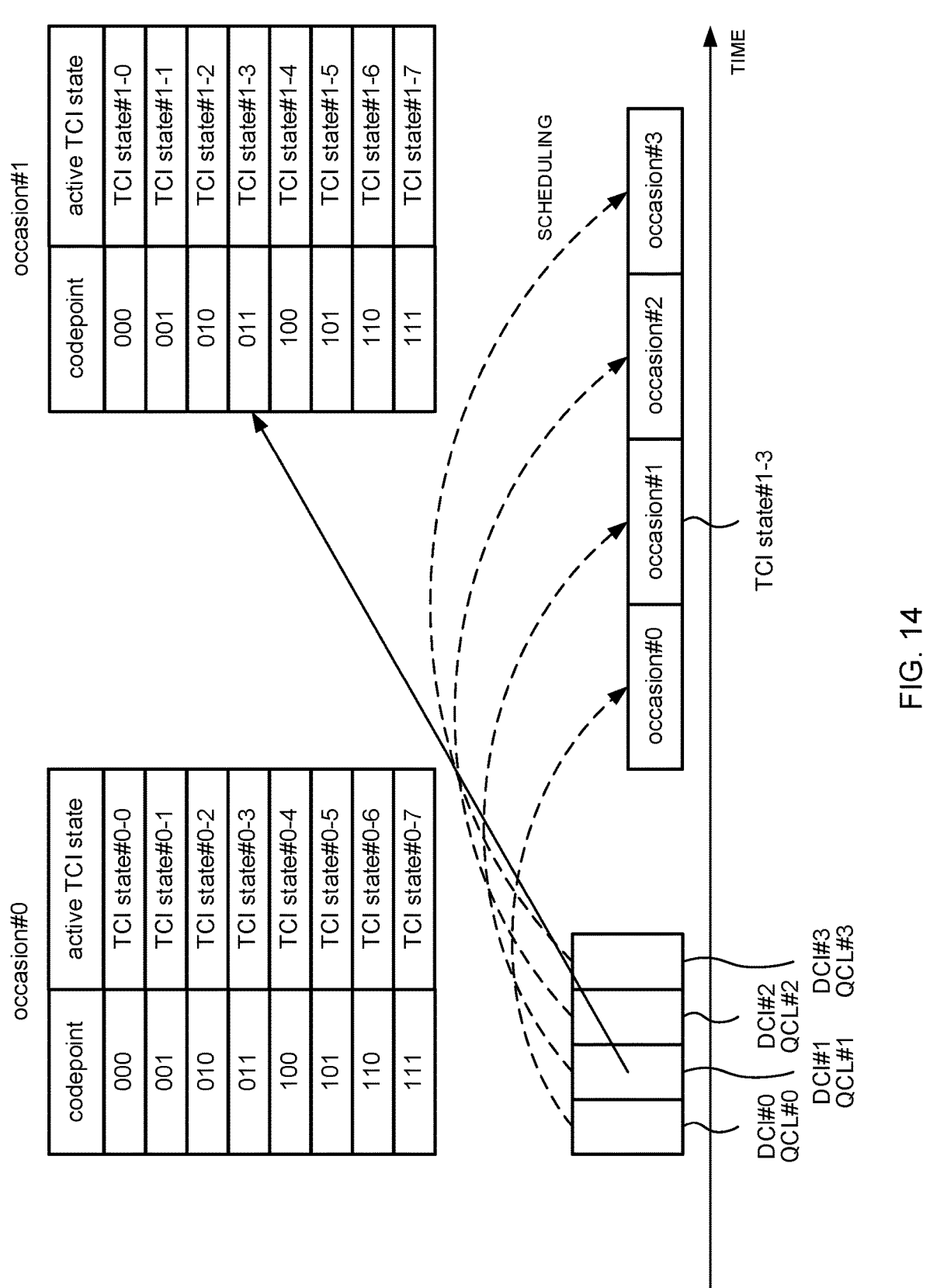
FIG. 14 is a diagram illustrating an example of a TCI state configuration/activation method 2.

In the example of FIG. 14, the TCI states #0-0 to #0-7 for the occasion #0 are activated, and the TCI states #1-0 to #1-7 for the occasion #1 are activated. The TCI field in DCI #1 scheduling the DL data for occasion #1 indicates code point 011. The UE uses the TCI state #1-3 corresponding to the code point 011 among the TCI states #1-0 to #1-7 activated for occasion #1, for reception of the DL data of the occasion #1.

[TCI State Configuration/Activation Method 3]

For each DCI/PDCCH/CORESET/search space/PDCCH monitoring occasion, the TCI state list for the PDSCH may be configured/activated.

Figure 15:
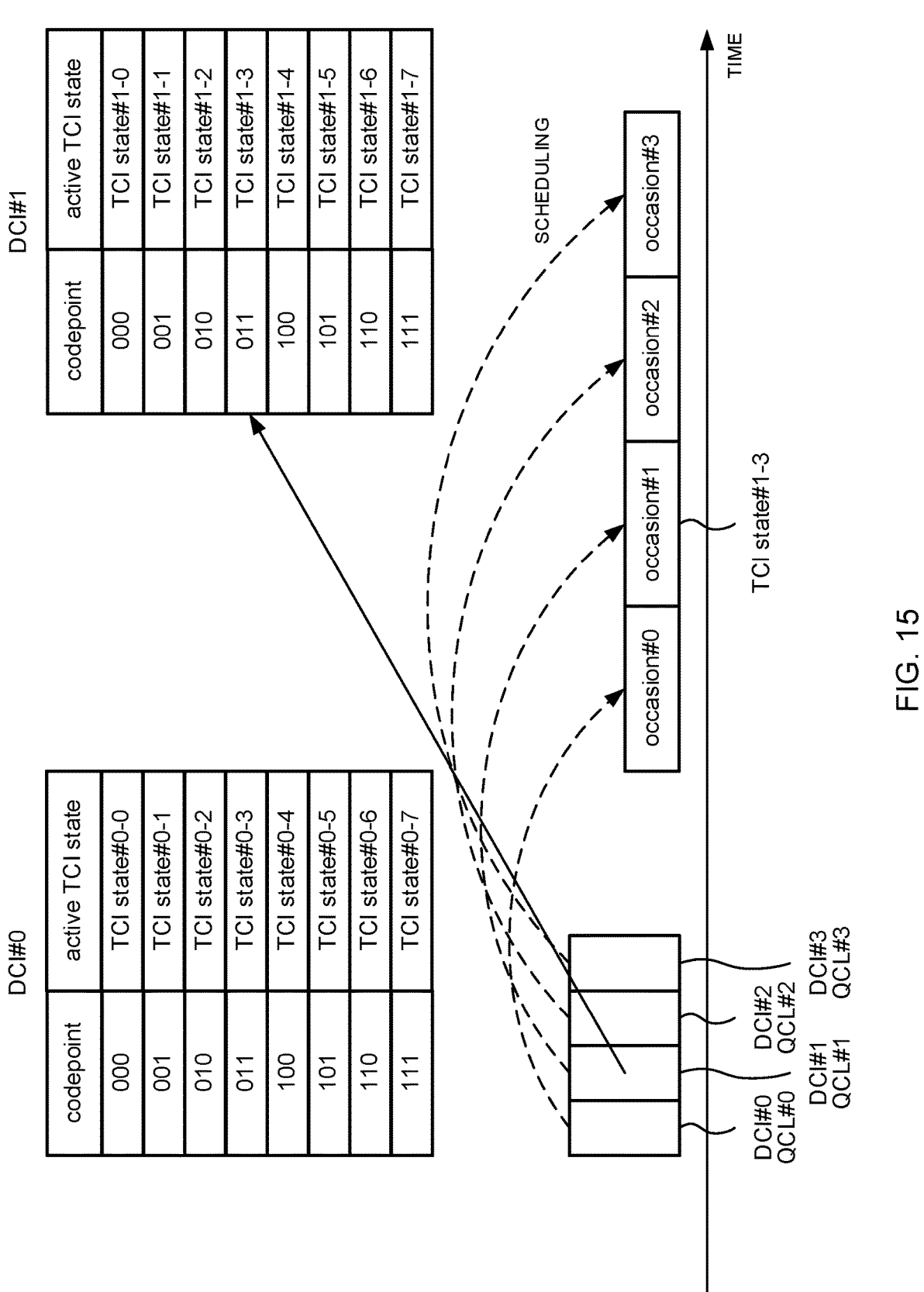
FIG. 15 is a diagram illustrating an example of a TCI state configuration/activation method 3.

In the example of FIG. 15, TCI states #0-0 to #0-7 for the PDCCH carrying DCI #0 are activated and TCI states #1-0 to #1-7 for the PDCCH carrying DCI #1 are activated. The TCI field in DCI #1 scheduling the DL data for occasion #1 indicates code point 011. The UE uses the TCI state #1-3 corresponding to the code point 011 among the TCI states #1-0 to #1-7 activated for occasion #1, for reception of the DL data of the occasion #1 scheduled by DCI #1.

<<DCI Size>>

The DCI size in each PDCCH monitoring occasion in one group scheduling search space may follow at least one of the following DCI sizes 1 and 2.

[DCI Size 1]

The DCI size in each PDCCH monitoring occasion in one group scheduling search space may be equal.

According to the DCI size 1, blind decoding of the UE can be simplified. In addition, in-phase addition of the pre-decoding bit or the pre-demodulation received signal becomes possible.

The value of the higher layer parameter (specific parameter, e.g. tci-PresentInDCI) for determining the DCI size may be commonly configured for all PDCCH monitoring occasions.

For the specific parameter, the UE may follow any one of the following specific parameter determination methods 1 to 4.

[Specific Parameter Determination Method 1]

When a specific parameter is configured for a certain reception occasion, the specific parameter is always configured for other reception occasions. The UE applies the specific parameter for the reception occasion to the field in the corresponding DCI.

For example, in a case where the PDSCH TCI state list is configured for a certain reception occasion and the active TCI state is notified (activated), the UE assumes that the PDSCH TCI state list is also configured for other reception occasions and the active TCI state is notified (activated).

[Specific Parameter Determination Method 2]

The UE uses the specific parameter configured for a certain reception occasion for other reception occasions. The UE applies the specific parameter for the reception occasion to the field in the corresponding DCI.

For example, when the PDSCH TCI state list is configured for the first reception occasion and the PDSCH TCI state list is not configured or the active TCI state is not notified for the second reception occasion, the UE derives the active TCI state for PDSCH for the second reception occasion based on the active TCI state for PDSCH for the first reception occasion.

[Specific Parameter Determination Method 3]

The UE obtains an indication regarding the specific parameter from a field in the DCI for the reception occasion for which the specific parameter is configured/notified, and ignores the field related to the specific parameter in the DCI for the reception occasion for which the specific parameter is not configured/notified.

For example, if the PDSCH TCI state list is configured for the first reception occasion, and the PDSCH TCI state list is not configured or the active TCI state is not notified for the second reception occasion, the UE determines the TCI state (beam) for the PDSCH of the first reception occasion by referring to the TCI field of the DCI for the first reception occasion, and ignores the TCI field of the DCI for the second reception occasion.

[Specific Parameter Determination Method 4]

The UE does not use specific parameters configured/notified for certain reception occasions. The UE ignores the field related to the specific parameter in each DCI.

For example, if the PDSCH TCI state list is configured for the first reception occasion, and the PDSCH TCI state list is not configured or the active TCI state is not notified for the second reception occasion, the UE ignores the TCI field of the DCI for all reception occasions.

When the UE ignores the TCI field of the DCI for a certain reception occasion, the default TCI state may be used for PDSCH reception of the reception occasion. The default TCI state may be specified in the specification, or may be configured/notified by higher layer signaling.

[DCI Size 2]

The DCI size in each PDCCH monitoring occasion in one group scheduling search space may be different.

The value of the higher layer parameter (specific parameter, e.g. tci-PresentInDCI) for determining the DCI size may be configured for each PDCCH monitoring occasion.

The configuration/activation of the TCI state list for PDSCH may be performed for each reception occasion or may be performed for each DCI.

According to the fifth embodiment described above, the UE can appropriately monitor the DCI for scheduling the DL data in at least one of the plurality of reception occasions.

Sixth Embodiment

<<PDSCH Resource Allocation>>

The UE may be configured/indicated by at least one of the RRC parameter, the MAC CE and the DCI to configure an association between the reception occasion and the PDSCH resource (resource information). For example, multiple associations may be configured by the RRC parameter, and one of the multiple associations may be activated by the MAC CE.

At least one of the following resource allocations 1 and 2 may be used for a PDSCH having a plurality of reception occasions.

[Resource Allocation 1]

A PDSCH resource may be configured for each reception occasion or DCI.

For example, as illustrated in FIG. 4A described above, a list of reception occasions for DL data or DCI may be configured in one PDSCH configuration. A PDSCH resource may be configured for each reception occasion or DCI. The PDSCH resource may include at least one of a TDRA and an FDRA.

[Resource Allocation 2]

The PDSCH resource may be configured for one reception occasion (for example, the first or last reception occasion) or one DCCI (for example, the first or last DCI).

For example, as illustrated in FIG. 4B described above, one reception occasion (one piece of DCI) for DL data may be configured in one PDSCH configuration. Using the PDSCH resources, PDSCH resources for the remaining reception occasions (DCI) may be derived (implicitly notified).

For example, the relationship (for example, $T_{offset}$) between the TD resource of the (m−1)th reception occasion and the TD resource of the mth reception occasion may be specified in the specification, may be configured by the RRC parameter, or may be reported by the UE capability. The FD resource of the mth reception occasion may be the same as the FD resource of the (m−1)th reception occasion.

The value of TDRA/FDRA may be in accordance with any of definitions 1 and 2 of TDRA/FDRA of the third embodiment.

If the TD/FD resource of the mth reception occasion depends on the TD/FD resource of the first reception occasion or the TD/FD resource of the (m−1)th reception occasion, the UE needs to detect not only the schedule DCI but also previous DCI. Therefore, the TD/FD resource of the mth reception occasion in this embodiment does not need to depend on the TD/FD resource of the first reception occasion or the TD/FD resource of the (m−1)th reception occasion.

Figure 16:
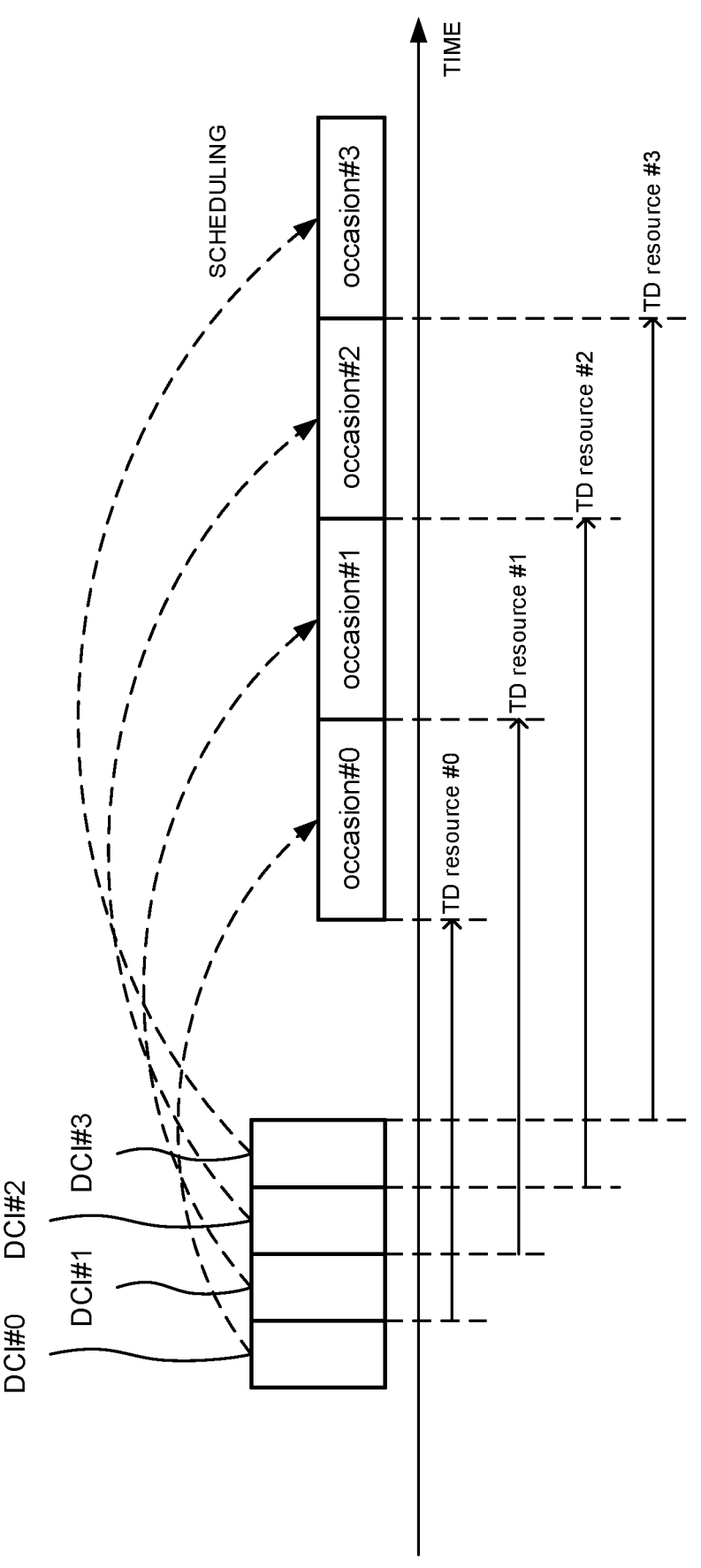
FIG. 16 is a diagram illustrating an example of a TDRA according to a sixth embodiment.

For example, the FD resource of each reception occasion may be represented as a PRB index from the first PRB index of the BWP. For example, as illustrated in FIG. 16, the TD resource of each reception occasion may be represented as a time (the number of slots/the number of symbols) from the schedule DCI (start or end).

According to the sixth embodiment described above, the UE can appropriately determine the resources of the PDSCH having a plurality of reception occasions.

Other Embodiments

A first function using at least one of the first to third embodiments and a second function using at least one of the fourth to sixth embodiments may be defined in the specification. The UE may be configured with either the first function or the second function by higher layer signaling. The UE may report supporting at least one of the first function and the second function.

A specific radio network temporarily identifier (RNTI) for scheduling at least one PDSCH of the first to sixth embodiments may be defined and configured in the UE. The DCI for scheduling the PDSCH may have a cyclic redundancy check (CRC) scrambled by the specific RNTI. The data of the PDSCH may be scrambled by the specific RNTI. The UE may decode the DCI or the PDSCH assuming scrambling by the specific RNTI. The specific RNTI may be configured for a plurality of group UEs, or may be configured for each UE.

The specific RNTI may be an existing RNTI (for example, RA-RNTI, C-RNTI, and the like). The DCI for scheduling the PDSCH may have a CRC scrambled by the specific RNTI. The data of the PDSCH may be scrambled by the specific RNTI. The UE may decode the DCI or the PDSCH assuming scrambling by the specific RNTI. The specific RNTI may be configured for a plurality of group UEs, or may be configured for each UE.

(Radio Communication System)

Hereinafter, a configuration of a radio communication system according to one embodiment of the present disclosure will be described. In this radio communication system, communication is performed using one or a combination of the radio communication methods according to the herein-contained embodiments of the present disclosure.

Figure 17:
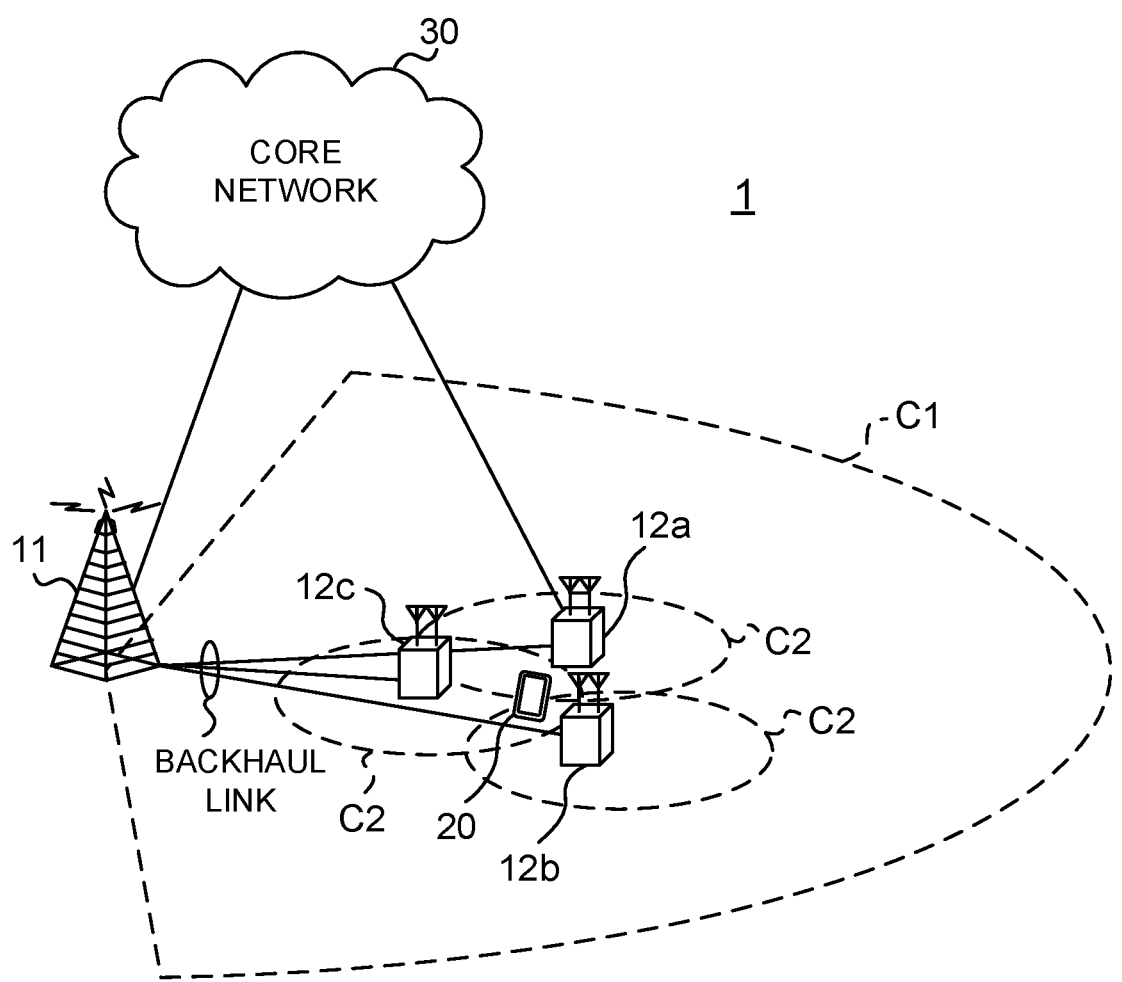
FIG. 17 is a diagram illustrating an example of a schematic configuration of a radio communication system according to one embodiment.

FIG. 17 is a diagram illustrating an example of a schematic configuration of the radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range (frequency range 1 (FR1)) and a second frequency range (frequency range 2 (FR2)). The macro cell C1 may be included in FR1, and the small cell C2 may be included in FR2. For example, FR1 may be a frequency range of 6 GHz or less (sub-6 GHZ), and FR2 may be a frequency range higher than 24 GHZ (above-24 GHZ). Note that the frequency ranges, definitions, and the like of the FR1 and FR2 are not limited thereto, and, for example, FR1 may correspond to a frequency range higher than FR2.

Further, the user terminal 20 may perform communication on each CC using at least one of time division duplex (TDD) and frequency division duplex (FDD).

The plurality of base stations 10 may be connected to each other in a wired manner (for example, an optical fiber, an X2 interface, or the like in compliance with common public radio interface (CPRI)) or in a wireless manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network

30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access methods.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by the user terminals 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. User data, higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH and the PUSCH.

Note that, the DCI for scheduling the PDSCH may be referred to as DL assignment, DL DCI, or the like, and the DCI for scheduling the PUSCH may be referred to as UL grant, UL DCI, or the like. Note that, the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a certain search space on the basis of search space configuration.

One search space may correspond to a PDCCH candidate corresponding to one or more aggregation levels. One or more search spaces may be referred to as a search space set. Note that the terms "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), and scheduling request (SR) may be transmitted on the PUCCH. A random access preamble for establishing connection with a cell may be transmitted on the PRACH.

Note that, in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) and a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, DMRSs may be referred to as "user terminal-specific reference signals (UE-specific Reference Signals)."

(Base Station)

Figure 18:
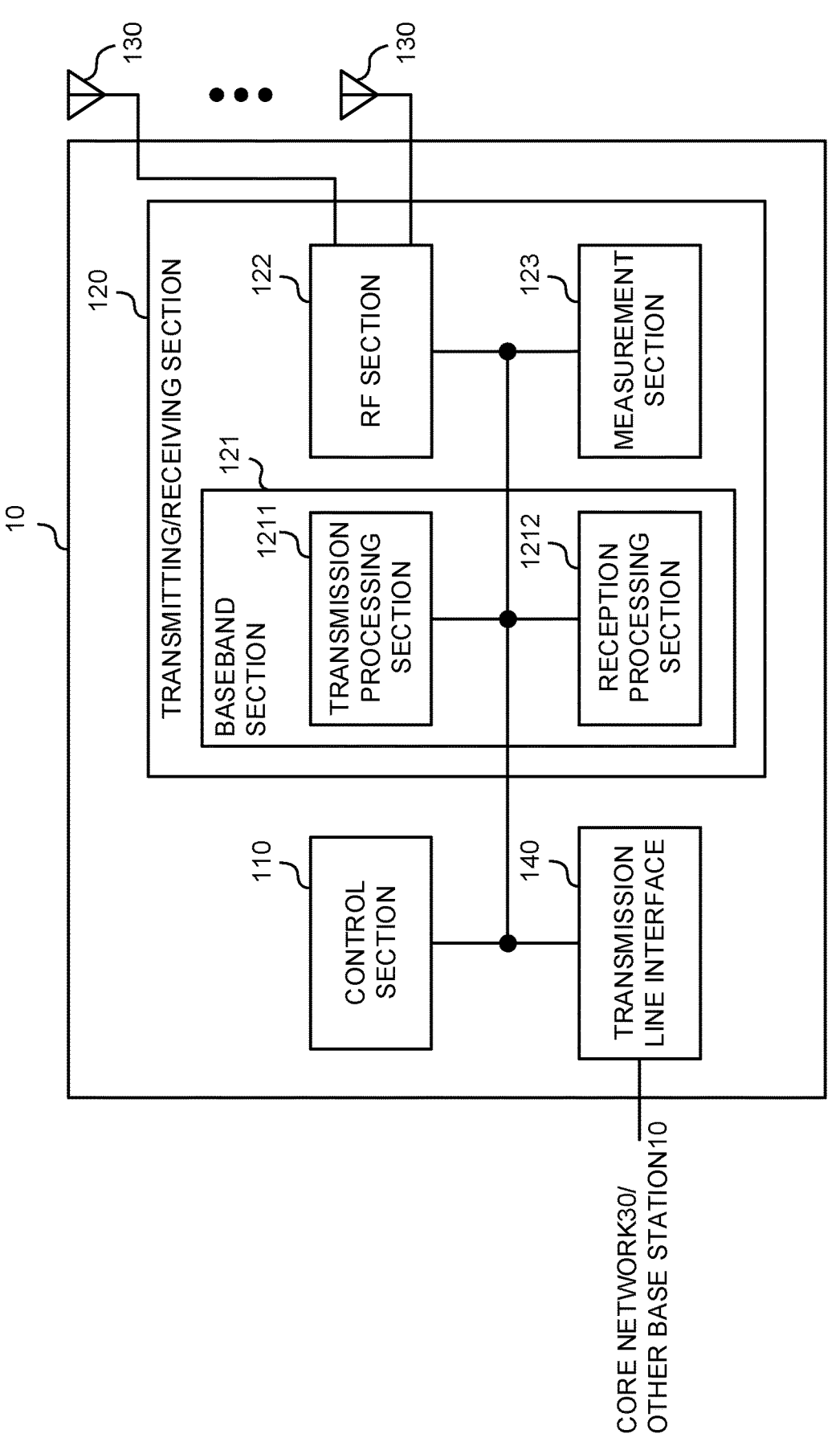
FIG. 18 is a diagram illustrating an example of a configuration of a base station according to one embodiment.

FIG. 18 is a diagram illustrating an example of a configuration of the base station according to one embodiment. The base station 10 includes a control section 110, a transmitting/receiving section 120, a transmitting/receiving antenna 130, and a transmission line interface 140. Note that one or more control sections 110, one or more transmitting/receiving sections 120, one or more transmitting/receiving antennas 130, and one or more transmission line interfaces 140 may be provided.

Note that, although this example mainly describes functional blocks of a characteristic part of the present embodiment, it may be assumed that the base station 10 includes other functional blocks that are necessary for radio communication as well. A part of processing performed by each section described below may be omitted.

The control section 110 controls the entire base station 10. The control section 110 can include a controller, a control circuit, and the like, which are described on the basis of common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmitting/receiving antenna 130, and the transmission line interface 140. The control section 110 may generate data to be transmitted as a signal, control information, a sequence, and the like, and may forward the data, the control information, the sequence, and the like to the transmitting/receiving section 120. The control section 110 may perform call processing (such as configuration or releasing) of a communication channel, state management of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 120 may be configured as an integrated transmitting/receiving section, or may include a transmitting section and a receiving section. The transmitting section may include the transmission processing section 1211 and the RF section 122. The receiving section may include the reception processing section 1212, the RF section 122, and the measurement section 123.

The transmitting/receiving antenna 130 can include an antenna, which is described on the basis of common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, and the like on the baseband signal, and may transmit a signal in the radio frequency range via the transmitting/receiving antenna 130.

Meanwhile, the transmitting/receiving section 120 (RF section 122) may perform amplification, filtering processing, demodulation to a baseband signal, and the like on the signal in the radio frequency range received by the transmitting/receiving antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RRM), channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus included in the core network 30, another base station 10, or the like, and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmitting/receiving antenna 130, and the transmission line interface 140.

The transmitting/receiving section 120 may transmit the downlink control information. The control section 110 may use a reception occasion corresponding to a quasi-co-location (QCL) parameter among the plurality of reception occasions for data transmission. The downlink control information may schedule the plurality of reception occasions. The data may be transmitted in each of the plurality of reception occasions.

The transmitting/receiving section 120 may transmit a plurality pieces of downlink control information. The control section 110 may use a reception occasion corresponding to a quasi-co-location (QCL) parameter among a plurality of reception occasions for data transmission. The plurality pieces of downlink control information may schedule each of the plurality of reception occasions. The data may be transmitted in each of the plurality of reception occasions.

(User Terminal)

Figure 19:
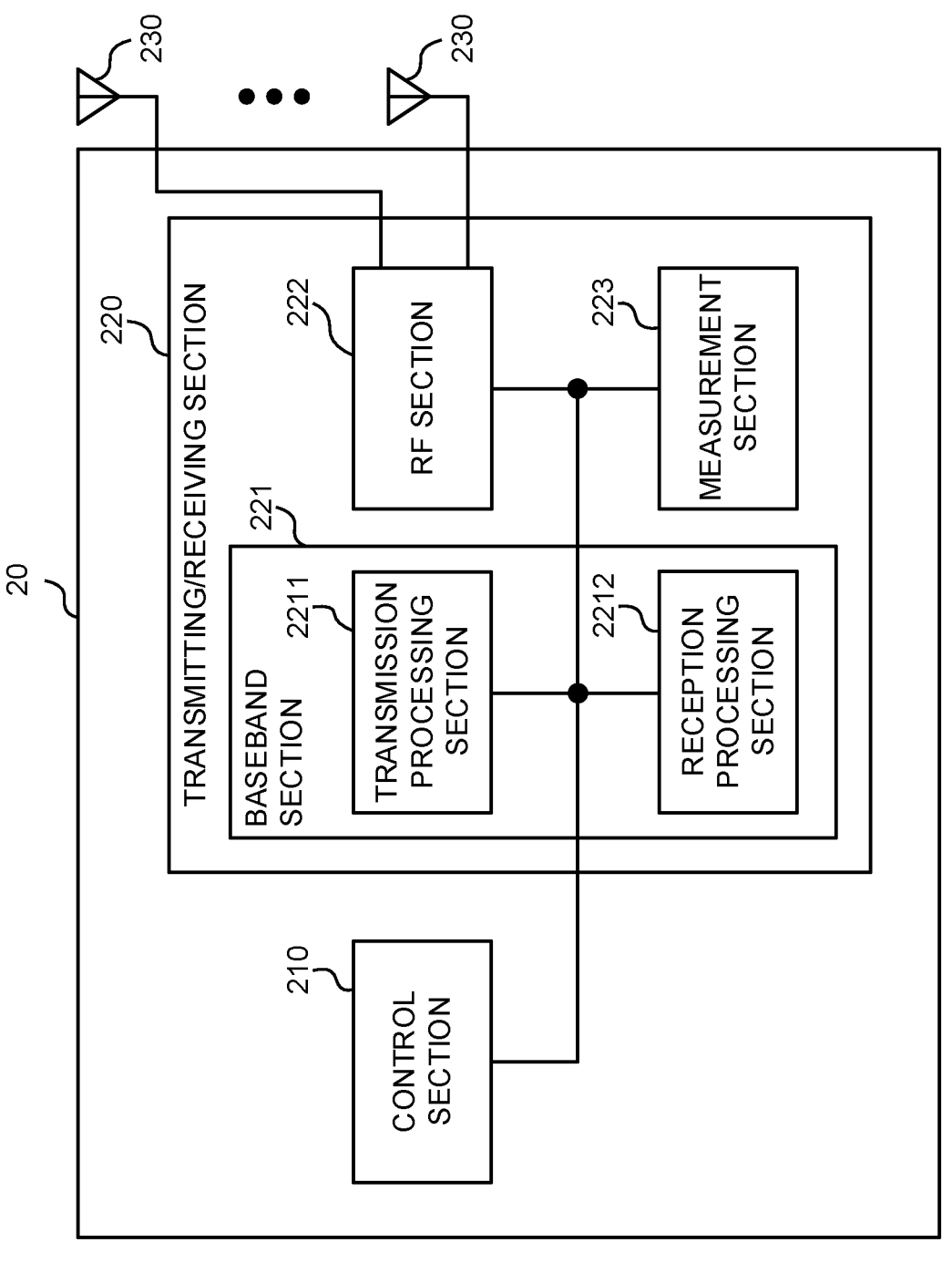
FIG. 19 is a diagram illustrating an example of a configuration of a user terminal according to one embodiment.

FIG. 19 is a diagram illustrating an example of a configuration of the user terminal according to one embodiment. The user terminal 20 includes a control section 210, a transmitting/receiving section 220, and a transmitting/receiving antenna 230. Note that, one or more each of the control sections 210, the transmitting/receiving sections 220, and the transmitting/receiving antennas 230 may be included.

Note that, although this example mainly describes functional blocks of a characteristic part of the present embodiment, it may be assumed that the user terminal 20 includes other functional blocks that are necessary for radio communication as well. A part of processing performed by each section described below may be omitted.

The control section 210 controls the entire user terminal 20. The control section 210 can include a controller, a control circuit, and the like that are described on the basis of common recognition in the technical field related to the present disclosure.

The control section 210 may control signal generation, mapping, and the like. The control section 210 may control transmission/reception, measurement, and the like using the transmitting/receiving section 220 and the transmitting/receiving antenna 230. The control section 210 may generate data, control information, a sequence, and the like to be transmitted as signals, and may transfer the data, control information, sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like that are described on the basis of common recognition in the technical field related to the present disclosure.

The transmitting/receiving section 220 may be formed as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmitting/receiving antenna 230 can include an antenna described on the basis of common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam or a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, and the like acquired from the control section 210, to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that, whether or not to apply DFT processing may be determined on the basis of configuration of transform precoding. If transform precoding is enabled for a channel (for example, PUSCH), the transmitting/receiving section 220 (transmission processing section 2211) may perform DFT processing as the transmission processing to transmit the channel by using a DFT-s-OFDM waveform, and if not, DFT processing does not have to be performed as the transmission processing.

The transmitting/receiving section 220 (RF section 222) may perform modulation to a radio frequency range, filtering processing, amplification, and the like on the baseband signal, to transmit a signal in the radio frequency range via the transmitting/receiving antenna 230.

Meanwhile, the transmitting/receiving section 220 (RF section 222) may perform amplification, filtering processing, demodulation to a baseband signal, and the like on the signal in the radio frequency range received by the transmitting/receiving antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220 or the transmitting/receiving antenna 230.

The transmitting/receiving section 220 may receive the downlink control information. The control section 210 may use a reception occasion corresponding to a quasi-co-location (QCL) parameter among the plurality of reception occasions for data reception. The downlink control information may schedule the plurality of reception occasions. The data may be transmitted in each of the plurality of reception occasions.

The transmitting/receiving section 220 may receive QCL parameter information indicating a plurality of QCL parameters associated with each of the plurality of reception occasions, or a QCL parameter associated with one of the plurality of reception occasions. The control section 210 may determine the QCL parameter to be used based on the QCL parameter information.

The transmitting/receiving section 220 may receive resource information indicating a plurality of resources associated with each of the plurality of reception occasions, or a resource associated with one of the plurality of reception occasions. The control section 210 may determine a resource of the data based on the resource information.

The control section 210 may use a transmission configuration indication (TCI) state indicated by the downlink control information for receiving the data.

The transmitting/receiving section 220 may receive one piece of downlink control information of a plurality of pieces of downlink control information. The control section 210 may use a reception occasion corresponding to a quasi-co-location (QCL) parameter among a plurality of reception occasions for data transmission. The plurality pieces of downlink control information may schedule each of the plurality of reception occasions. The data may be transmitted in each of the plurality of reception occasions.

The plurality of pieces of downlink control information is transmitted in each of a plurality of physical downlink control channel monitoring occasions, a plurality of search spaces, or a plurality of control resource sets.

The control section 210 may use any one of a QCL parameter used for receiving the downlink control information, a QCL parameter corresponding to the reception occasions, and a QCL parameter indicated by the downlink control information, for receiving the data.

The transmitting/receiving section 220 may receive resource information indicating a plurality of resources associated with each of the plurality of reception occasions, or a resource associated with one of the plurality of reception occasions. The control section 210 may determine a resource of the data based on the resource information.

(Hardware Configuration)

Note that the block diagrams that have been used to describe the above embodiments illustrate blocks in functional units. These functional blocks (components) may be implemented in arbitrary combinations of at least one of hardware and software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a radio manner, or the like, for example) and using these apparatuses. The functional block may be implemented by combining the one apparatus or the plurality of apparatuses with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and the like. For example, a functional block (component) that has a transmission function may be referred to as a transmitting section (transmitting unit), a transmitter, and the like. In any case, as described above, the implementation method is not particularly limited.

Figure 20:
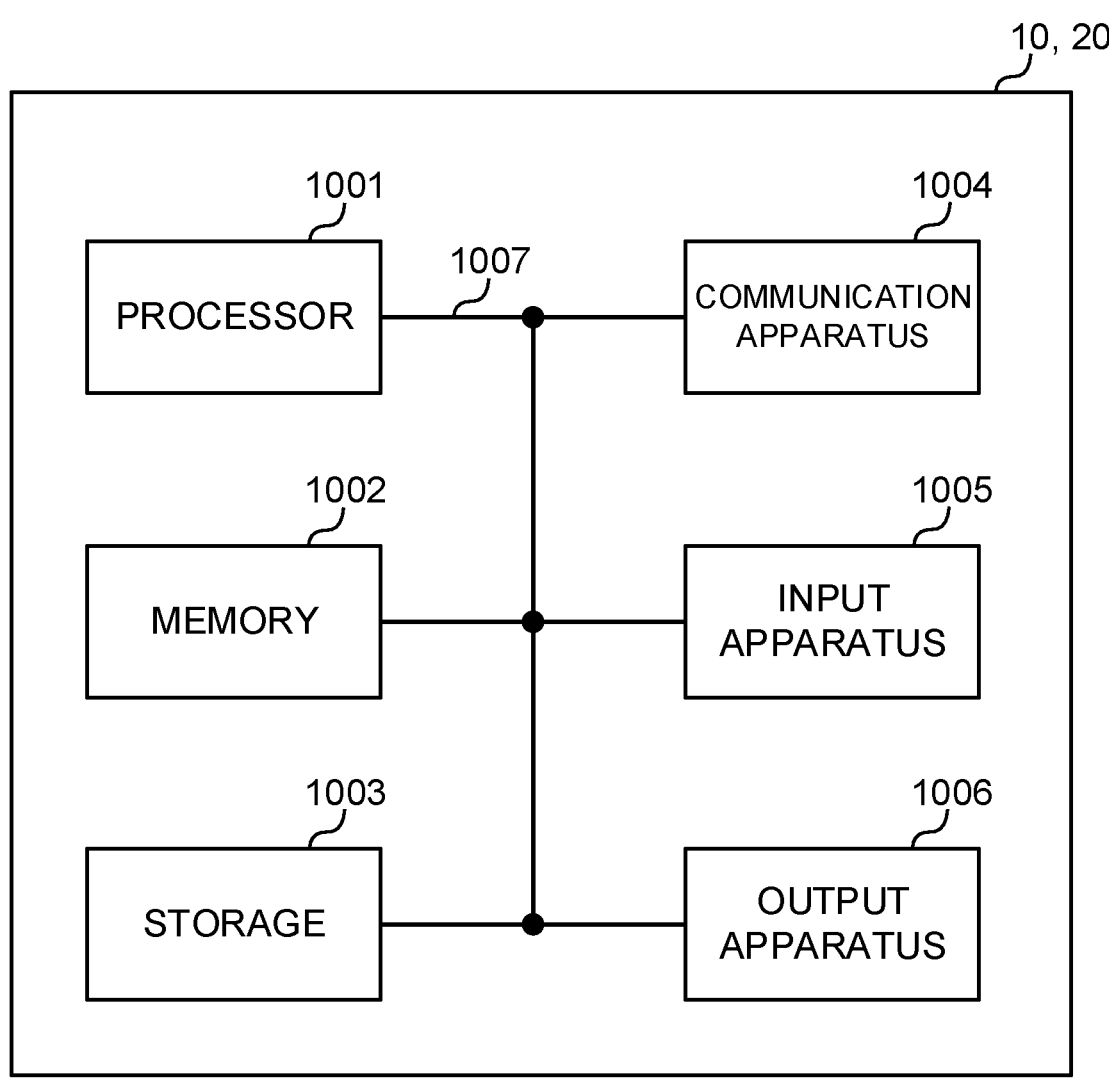
FIG. 20 is a diagram illustrating an example of a hardware configuration of the base station and the user terminal according to one embodiment.

For example, the base station, the user terminal, and so on according to one embodiment of the present disclosure may function as a computer that executes the processing of the radio communication method of the present disclosure. FIG. 20 is a diagram illustrating an example of a hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, and a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is shown, a plurality of processors may be provided. Further, the processing may be executed by one processor, or the processing may be executed by two or more processors simultaneously or sequentially, or using other methods. Note that the processor 1001 may be implemented with one or more chips.

Each function of the base station 10 and the user terminal 20 is implemented by, for example, reading given software (program) onto hardware such as the processor 1001 and the memory 1002, and by controlling the operation in the processor 1001, the communication in the communication apparatus 1004, and at least one of the reading or writing of data in the memory 1002 and the storage 1003.

The processor 1001 may control the whole computer by, for example, running an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and the like from at least either the storage 1003 or the communication apparatus 1004 into the memory 1002, and executes various processing according to these. As the program, a program that causes a computer to execute at least a part of the operation described in the above-described embodiment is used. For example, the control section 110 (210) may be implemented by control programs that are stored in the memory 1002 and that operate on the processor 1001, and other functional blocks may be implemented likewise.

The memory 1002 is a computer-readable recording medium, and may include, for example, at least one of a read only memory (ROM), an erasable programmable ROM (EPROM), an electrically EPROM (EEPROM), a random access memory (RAM), or other appropriate storage media. The memory 1002 may be referred to as a register, a cache, a main memory (primary storage apparatus), and the like. The memory 1002 can store a program (program code), a software module, and the like executable for implementing the radio communication method according to one embodiment of the present disclosure.

The storage 1003 is a computer-readable recording medium, and may include, for example, at least one of a flexible disk, a floppy (registered trademark) disk, a magneto-optical disk (for example, a compact disc ROM (CD-ROM) and the like), a digital versatile disk, a Blu-ray (registered trademark) disk), a removable disk, a hard disk drive, a smart card, a flash memory device (for example, a card, a stick, or a key drive), a magnetic stripe, a database, a server, or other appropriate storage media. The storage 1003 may be referred to as "secondary storage apparatus."

The communication apparatus 1004 is hardware (transmitting/receiving device) for performing inter-computer communication via at least one of a wired network or a wireless network, and is referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmitting/receiving antenna 130 (230), and the like described above may be implemented by the communication apparatus 1004. The transmitting/receiving section 120 (220) may be implemented by physically or logically separating the transmitting section 120*a* (220*a*) and the receiving section 120*b* (220*b*) from each other.

The input apparatus 1005 is an input device for receiving input from the outside (for example, a keyboard, a mouse, a microphone, a switch, a button, a sensor and so on). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by using the hardware. For example, the processor 1001 may be implemented with at least one of these pieces of hardware.

Variations

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or more periods (frames) in the time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, specific windowing processing performed by a transceiver in the time domain, or the like.

The slot may include one or more symbols in the time domain (orthogonal frequency division multiplexing (OFDM) symbols, single carrier frequency division multiple access (SC-FDMA) symbols, and the like). Also, a slot may be a time unit based on numerology.

The slot may include a plurality of mini slots. Each mini slot may include one or more symbols in the time domain. Further, the mini slot may be referred to as a subslot. Each mini slot may include fewer symbols than the slot. A PDSCH (or PUSCH) transmitted in a time unit larger than the mini slot may be referred to as "PDSCH (PUSCH) mapping type A". A PDSCH (or PUSCH) transmitted using the mini slot may be referred to as "PDSCH (PUSCH) mapping type B".

A radio frame, a subframe, a slot, a minislot and a symbol all represent the time unit in signal communication. The radio frame, the subframe, the slot, the mini slot, and the symbol may be called by other applicable names, respectively. Note that time units such as the frame, the subframe, the slot, the mini slot, and the symbol in the present disclosure may be replaced with each other.

For example, one subframe may be referred to as TTI, a plurality of consecutive subframes may be referred to as TTI, or one slot or one mini slot may be referred to as TTI. That is, at least one of the subframe and the TTI may be a subframe (1 ms) in the existing LTE, may be a period shorter than 1 ms (for example, one to thirteen symbols), or may be a period longer than 1 ms. Note that the unit to represent the TTI may be referred to as a "slot," a "mini slot" and so on, instead of a "subframe."

Here, a TTI refers to the minimum time unit of scheduling in radio communication, for example. For example, in the LTE system, a base station performs scheduling to allocate radio resources (a frequency bandwidth, transmission power, and the like that can be used in each user terminal) to each user terminal in TTI units. Note that the definition of TTIs is not limited to this.

The TTI may be a transmission time unit such as a channel-coded data packet (transport block), a code block, a codeword, or the like, or may be a processing unit such as scheduling or link adaptation. Note that when TTI is given, a time interval (for example, the number of symbols) in which the transport blocks, the code blocks, the codewords, and the like are actually mapped may be shorter than TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini slot, a subslot, a slot, or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or more contiguous subcarriers in the frequency domain. The number of subcarriers included in the RB may be the same regardless of the numerology, and may be twelve, for example. The number of subcarriers included in the RB may be determined based on numerology.

Also, an RB may include one or more symbols in the time domain, and may be one slot, one minislot, one subframe or one TTI in length. One TTI, one subframe, and the like may each include one or more resource blocks.

Note that one or more RBs may be referred to as a physical resource block (PRB), a subcarrier group (SCG), a resource element group (REG), a PRB pair, an RB pair, and the like.

Furthermore, a resource block may include one or more resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by the index of the RB based on a common reference point of the carrier. A PRB may be defined in a certain BWP and numbered within the BWP.

The BWP may include a BWP for UL (UL BWP) and a BWP for DL (DL BWP). For the UE, one or more BWPs may be configured within one carrier.

At least one of the configured BWPs may be active, and the UE need not expect to transmit or receive a given signal/channel outside the active BWP. Note that, a "cell", a "carrier", and the like in the present disclosure may be replaced with a BWP.

Note that the structures of radio frames, subframes, slots, minislots, symbols and so on described above are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the length of cyclic prefix (CP), and the like can be variously changed.

Furthermore, the information and parameters described in the present disclosure may be represented in absolute values, represented in relative values with respect to given values, or represented using other corresponding information. For example, a radio resource may be specified by a predetermined index.

Names used for, for example, parameters in the present disclosure are in no respect limitative. Further, any mathematical expression or the like that uses these parameters may differ from those explicitly disclosed in the present disclosure. Since various channels (PUCCH, PDCCH, and the like) and information elements can be identified by any suitable names, various names allocated to these various channels and information elements are not restrictive names in any respect.

The information, signals, and the like described in the present disclosure may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Further, information, signals, and the like can be output in at least one of a direction from higher layers to lower layers and a direction from lower layers to higher layers. Information, signals and so on may be input and output via a plurality of network nodes.

The information, signals and so on that are input and/or output may be stored in a specific location (for example, in a memory), or may be managed in a control table. The information, signals, and the like to be input and output can be overwritten, updated, or appended. The output information, signals, and the like may be deleted. The information, signals and so on that are input may be transmitted to other pieces of apparatus.

Notification of information may be performed not only by using the aspects/embodiments described in the present disclosure but also using another method. For example, the notification of information in the present disclosure may be performed by using physical layer signaling (for example, downlink control information (DCI) or uplink control information (UCI)), higher layer signaling (for example, radio resource control (RRC) signaling, broadcast information (master information block (MIB)), system information block (SIB), or the like), or medium access control (MAC) signaling), another signal, or a combination thereof.

Note that the physical layer signaling may be referred to as Layer 1/Layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of the MAC signaling may be performed using, for example, an MAC control element (CE).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server, or another remote source by using at least one of a wired technology (coaxial cable, optical fiber cable, twisted pair, digital subscriber line (DSL), or the like) or a wireless technology (infrared rays, microwaves, and the like), at least one of the wired technology or the wireless technology is included within the definition of a transmission medium.

The terms "system" and "network" used in the present disclosure may be used interchangeably. The "network" may mean an apparatus (for example, a base station) included in the network.

In the present disclosure, terms such as "precoding" "precoder", "weight (precoding weight)", "quasi-co-location (QCL)", "transmission configuration indication state (TCI state)" "spatial relation", "spatial domain filter", "transmit power" ""phase rotation", "antenna port", "antenna port group", "layer", "number of layers", "rank", "resource" resource set", "resource group", "beam", "beam width", "beam angle", "antenna", "antenna element", and "panel" can be used interchangeably.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small base station for indoors (remote radio head (RH))). The term "cell" or "sector" refers to a part or the whole of a coverage area of at least one of the base station or the base station subsystem that performs a communication service in this coverage.

In the present disclosure, the terms such as "mobile station (MS)", "user terminal", "user equipment (UE)", and "terminal" can be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and mobile station may be called as a transmission apparatus, a reception apparatus, a wireless communication apparatus and the like. Note that at least one of the base station and the mobile station may be a device mounted on a moving body, a moving body itself, and the like. The moving body may be a transportation (for example, a car, an airplane, or the like), an unmanned moving body (for example, a drone, an autonomous car, or the like), or a (manned or unmanned) robot. Note that at least one of the base station and the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, an uplink channel and a downlink channel may be replaced with a side channel.

Likewise, the user terminal in the present disclosure may be replaced with the base station. In this case, the base station 10 may be configured to have the functions of the user terminal 20 described above.

In the present disclosure, an operation performed by a base station may be performed by an upper node thereof in some cases. In a network including one or more network nodes with base stations, it is clear that various operations performed for communication with a terminal can be performed by a base station, one or more network nodes (examples of which include but are not limited to mobility management entity (MME) and serving-gateway (S-GW)) other than the base station, or a combination thereof.

The aspects/embodiments illustrated in the present disclosure may be used individually or in combinations, which may be switched depending on the mode of implementation. Further, the order of processing procedures, sequences, flowcharts, and the like of the aspects/embodiments described in the present disclosure may be re-ordered as long as there is no inconsistency. For example, although various methods have been illustrated in the present disclosure with various components of steps using exemplary orders, the specific orders that are illustrated herein are by no means limiting.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), 6th generation mobile communication system (6G), xth generation mobile communication system (xG) (x is, for example, an integer or decimal), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined and applied (for example, a combination of LTE or LTE-A and 5G, and the like).

The phrase "based on" as used in the present disclosure does not mean "based only on", unless otherwise specified. In other words, the phrase "based on" means both "based only on" and "based at least on."

Reference to elements with designations such as "first" "second", and so on as used in the present disclosure does not generally limit the number/quantity or order of these elements. These designations can be used in the present disclosure, as a convenient way of distinguishing between two or more elements. In this way, reference to the first and second elements does not imply that only two elements may be employed, or that the first element must precede the second element in some way.

The term "determining" as used in the present disclosure may encompass a wide variety of operations. For example, "determining" may be regarded as judging, calculating, computing, processing, deriving, investigating, looking up, search, inquiry (for example, looking up in a table, database, or another data structure), ascertaining, and the like.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on.

In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

In addition, "determining" as used herein may be read as "assuming", "expecting", "considering", or the like.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency, microwave, and optical (both visible and invisible) regions, or the like.

In the present disclosure, the phrase "A and B are different" may mean "A and B are different from each other". Note that the phrase may mean that "A and B are different from C". The terms such as "separated", "coupled", and the like may be similarly interpreted as "different".

When the terms such as "include", "including", and variations of these terms are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a" "an", and "the" are added in English translation, the present disclosure may include the plural forms of nouns that follow these articles.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined on the basis of the description of claims. Consequently, the description of the present disclosure is provided only for the purpose of explaining examples, and should by no means be construed to limit the invention according to the present disclosure in any way.

The invention claimed is:

1. A terminal comprising:
   a receiver that receives downlink control information (DCI) scheduling a multicast physical downlink shared channel (PDSCH); and
   a processor that controls reception of the multicast PDSCH on four reception occasions,
   wherein one transport block is transmitted on each of the four reception occasions,
   the DCI is transmitted with cyclic redundancy check (CRC) scrambled by a specific radio network temporary identifier (RNTI) for scheduling the multicast PDSCH,
   the transport block is scrambled using the specific RNTI,
   the receiver receives a first configuration including a first time domain resource allocation for a terminal-specific PDSCH and a second configuration including a second time domain resource allocation for the multicast PDSCH, and
   the processor determines time domain resource allocation and a transmission configuration indication (TCI) state for a first reception occasion among the four reception occasions based on the second configuration, determines time domain resource allocations for second, third and fourth reception occasions among the four reception occasions based on the time domain resource allocation for the first reception occasion, and determines TCI states for the second, third and fourth reception occasions based on the TCI state for the first reception occasion.

2. The terminal according to claim 1, wherein the receiver monitors the DCI in a common search space for the multicast PDSCH.

3. The terminal according to claim 1, wherein presence of a TCI field in the DCI is configured, and the DCI includes the TCI field.

4. A radio communication method for a terminal, comprising:
   receiving downlink control information (DCI) scheduling a multicast physical downlink shared channel (PDSCH); and controlling reception of the multicast PDSCH on four reception occasions, wherein one transport block is transmitted on each of the four reception occasions, the DCI is transmitted with cyclic redundancy check (CRC) scrambled by a specific radio network temporary identifier (RNTI) for scheduling the multicast PDSCH, the transport block is scrambled using the specific RNTI, the terminal receives a first configuration including a first time domain resource allocation for a terminal-specific PDSCH and a second configuration including a second time domain resource allocation for the multicast PDSCH, and the terminal determines time domain resource allocation and a transmission configuration indication (TCI) state for a first reception occasion among the four reception occasions based on the second configuration, determines time domain resource allocations for second, third and fourth reception occasions among the four reception occasions based on the time domain resource allocation for the first reception occasion, and determines TCI states for the second, third and fourth reception occasions based on the TCI state for the first reception occasion.

5. A base station comprising:

a transmitter that transmits downlink control information (DCI) scheduling a multicast physical downlink shared channel (PDSCH); and a processor that controls transmission of the multicast PDSCH on four transmission occasions, wherein one transport block is transmitted on each of the four transmission occasions, the DCI is transmitted with cyclic redundancy check (CRC) scrambled by a specific radio network temporary identifier (RNTI) for scheduling the multicast PDSCH, the transport block is scrambled using the specific RNTI, the transmitter transmits a first configuration including a first time domain resource allocation for a terminal-specific PDSCH and a second configuration including a second time domain resource allocation for the multicast PDSCH, and the processor determines time domain resource allocation and a transmission configuration indication (TCI) state for a first transmission occasion among the four transmission occasions based on the second configuration, determines time domain resource allocations for second, third and fourth transmission occasions among the four transmission occasions based on the time domain resource allocation for the first transmission occasion, and determines TCI states for the second, third and fourth transmission occasions based on the TCI state for the first transmission occasion.

6. A system comprising a terminal and a base station, wherein the terminal comprises:

a receiver that receives downlink control information (DCI) scheduling a multicast physical downlink shared channel (PDSCH); and a processor that controls reception of the multicast PDSCH on four reception occasions, one transport block is transmitted on each of the four reception occasions, the DCI is transmitted with cyclic redundancy check (CRC) scrambled by a specific radio network temporary identifier (RNTI) for scheduling the multicast PDSCH, the transport block is scrambled using the specific RNTI, the receiver receives a first configuration including a first time domain resource allocation for a terminal-specific PDSCH and a second configuration including a second time domain resource allocation for the multicast PDSCH, the processor determines time domain resource allocation and a transmission configuration indication (TCI) state for a first reception occasion among the four reception occasions based on the second configuration, determines time domain resource allocations for second, third and fourth reception occasions among the four reception occasions based on the time domain resource allocation for the first reception occasion, and determines TCI states for the second, third and fourth reception occasions based on the TCI state for the first reception occasion, and the base station transmits the DCI.

* * * * *